(12) United States Patent
Holland et al.

(10) Patent No.: US 12,146,313 B2
(45) Date of Patent: Nov. 19, 2024

(54) LEDGER CONNECTOR

(71) Applicant: Simpson Strong-Tie Company Inc., Pleasanton, CA (US)

(72) Inventors: Rachel Marie Holland, San Ramon, CA (US); Timothy M. Stauffer, Pleasant Hill, CA (US); Jin-Jie Lin, Livermore, CA (US); Benedict Ang, Dublin, CA (US)

(73) Assignee: Simpson Strong-Tie Company Inc., Pleasanton, CA (US)

(*) Notice: Subject to any disclaimer, the term of this patent is extended or adjusted under 35 U.S.C. 154(b) by 0 days.

(21) Appl. No.: 16/741,651

(22) Filed: Jan. 13, 2020

(65) Prior Publication Data

US 2020/0325671 A1 Oct. 15, 2020

Related U.S. Application Data

(60) Provisional application No. 62/791,875, filed on Jan. 13, 2019.

(51) Int. Cl.
*E04B 1/26* (2006.01)
*E04B 1/00* (2006.01)
(Continued)

(52) U.S. Cl.
CPC ............ *E04B 1/2604* (2013.01); *E04B 1/003* (2013.01); *E04B 1/58* (2013.01); *E04B 2001/2644* (2013.01); *E04B 2001/5875* (2013.01)

(58) Field of Classification Search
CPC .......... E04B 1/003; E04B 1/58; E04B 1/2604; E04B 2001/2644; E04B 2001/5875
(Continued)

(56) References Cited

U.S. PATENT DOCUMENTS 1,405,042 A    1/1922   Kraft
1,619,836 A *  3/1927   Tasman .................. B62D 29/02
                                                 296/29
(Continued)

FOREIGN PATENT DOCUMENTS

AU    19879/83    4/1984
CA    153946 S    8/2014
(Continued)

OTHER PUBLICATIONS

European Patent Office, PCT—Written Opinion of the International Searching Authority and International Search Report, Apr. 23, 2020, 9 pages, European Patent Office, Netherlands.
(Continued)

*Primary Examiner* — James J Buckle, Jr.
(74) *Attorney, Agent, or Firm* — Charles R. Cypher

(57) ABSTRACT

A connection and a method of making a connection between an outer member and one or more inner structural members of a structure such as a building, the connection having a compression strut having an inner portion and an outer portion, the inner portion being supported by one of the one or more inner structural members, the outer portion being in contact with the outer member, a connector plate engaging the compression strut and the outer member and one or more tension fasteners attaching the connector plate to one or more of the one or more inner structural members.

18 Claims, 38 Drawing Sheets

(51) Int. Cl.
*E04B 1/38* (2006.01)
*E04B 1/58* (2006.01)

(58) Field of Classification Search
USPC .................................................. 52/483.1, 27
See application file for complete search history.

(56) References Cited

U.S. PATENT DOCUMENTS

| | | | |
|---|---|---|---|
| 2,549,393 | A | 4/1951 | Siesel |
| 2,885,538 | A | 5/1959 | Mahon et al. |
| 2,969,705 | A | 1/1961 | Becker |
| 2,986,059 | A | 5/1961 | Duffy et al. |
| 3,016,784 | A | 1/1962 | Parkin et al. |
| 3,083,794 | A | 4/1963 | Stovall, Jr. |
| 3,172,238 | A | 3/1965 | Sandin |
| 3,214,875 | A | 11/1965 | Slowinski et al. |
| 3,228,710 | A | 1/1966 | Chodorowski |
| 3,341,997 | A | 9/1967 | Pestel et al. |
| 3,362,278 | A | 1/1968 | Munse |
| 3,365,221 | A * | 1/1968 | Jureit ............... E04F 15/06 52/177 |
| 3,425,473 | A | 2/1969 | Knowlton |
| 3,438,300 | A | 4/1969 | Blom et al. |
| 3,648,335 | A | 3/1972 | Henning |
| 4,430,033 | A | 2/1984 | McKewan |
| 4,548,534 | A | 10/1985 | Trummer |
| 4,584,813 | A | 4/1986 | Hudson |
| 4,791,767 | A | 12/1988 | Boeshart |
| 4,811,542 | A | 3/1989 | Jewell |
| 4,911,594 | A | 3/1990 | Fisher |
| 4,953,339 | A | 9/1990 | Jewell |
| 5,058,358 | A | 10/1991 | Stratton |
| 5,143,171 | A * | 9/1992 | Glynn ............... A62B 35/04 182/3 |
| 5,201,156 | A | 4/1993 | Newman |
| 5,253,945 | A | 10/1993 | Hosokawa |
| 5,687,535 | A * | 11/1997 | Rohlf ............... A62B 35/0068 52/713 |
| 5,775,862 | A | 7/1998 | Cullen |
| 5,816,762 | A | 10/1998 | Miura et al. |
| 6,079,922 | A | 6/2000 | Ross et al. |
| 6,186,391 | B1 | 2/2001 | Barandun |
| 6,315,489 | B1 * | 11/2001 | Watanabe ......... E04F 13/0846 403/381 |
| 6,397,552 | B1 | 6/2002 | Bourque |
| 6,402,419 | B1 * | 6/2002 | Watanabe ......... E04F 13/0846 403/381 |
| 6,427,391 | B1 | 8/2002 | Lyons |
| 6,609,866 | B2 | 8/2003 | Huang et al. |
| 6,615,560 | B2 * | 9/2003 | Ito ................... E04F 13/0846 52/506.06 |
| 6,637,170 | B2 * | 10/2003 | Ito ................... E04F 13/0864 52/506.06 |
| 6,817,157 | B2 | 11/2004 | Bourque |
| 6,830,405 | B2 * | 12/2004 | Watanabe ......... E04F 13/0826 403/11 |
| 6,945,004 | B1 | 9/2005 | Ghiringhelli |
| 7,024,833 | B1 | 4/2006 | Rice |
| 7,178,298 | B1 | 2/2007 | Ebeling, Sr. |
| 7,254,926 | B2 | 8/2007 | Eldeen |
| 7,354,639 | B2 | 4/2008 | Durney et al. |
| 7,596,917 | B2 | 10/2009 | Schloemer et al. |
| 7,637,072 | B2 | 12/2009 | Parish |
| 7,669,373 | B2 | 3/2010 | Muir |
| 7,748,188 | B2 * | 7/2010 | Ito ................... E04F 13/0846 52/506.06 |
| 8,087,207 | B2 | 1/2012 | Ghiringhelli |
| 8,202,031 | B2 | 6/2012 | Hartmann |
| 8,240,964 | B2 | 8/2012 | Motsch et al. |
| 8,276,323 | B2 | 10/2012 | Gray et al. |
| 8,307,610 | B2 | 11/2012 | Landers |
| 8,365,484 | B2 | 2/2013 | Foley |
| 8,555,580 | B2 | 10/2013 | Vilasineekul |
| 8,584,425 | B2 * | 11/2013 | Wagner ............. E04F 13/0837 52/588.1 |
| 8,621,802 | B2 | 1/2014 | Spyrou |
| 8,756,871 | B1 * | 6/2014 | Johnson ............ E02D 31/02 52/27 |
| 8,834,337 | B2 | 9/2014 | Hannu et al. |
| 8,898,993 | B2 | 12/2014 | Rodgers |
| 9,038,338 | B2 | 5/2015 | Rice |
| 9,045,892 | B2 | 6/2015 | Smith et al. |
| D737,670 | S | 9/2015 | Beyerle et al. |
| 9,145,669 | B1 | 9/2015 | Broughton |
| 9,145,672 | B1 | 9/2015 | Broughton |
| 9,151,058 | B1 | 10/2015 | Leathe |
| 9,194,118 | B2 | 11/2015 | Spyrou |
| 9,457,734 | B2 | 10/2016 | Smith et al. |
| D811,863 | S | 3/2018 | Beyerle et al. |
| 9,932,735 | B1 | 4/2018 | Biasucci |
| 9,989,080 | B1 | 6/2018 | Kunken et al. |
| 10,024,046 | B2 | 7/2018 | Higginbotham |
| 10,060,118 | B2 | 8/2018 | Callahan |
| 10,240,340 | B2 | 3/2019 | Studer |
| 10,508,454 | B2 * | 12/2019 | Suzuki ............. E04F 13/0846 |
| 10,745,908 | B2 | 8/2020 | Studer |
| 2005/0160683 | A1 | 7/2005 | Eldeen |
| 2006/0130414 | A1 * | 6/2006 | Walther ............ E04B 1/003 52/289 |
| 2006/0260259 | A1 | 11/2006 | Morse |
| 2010/0122506 | A1 * | 5/2010 | Kato ................ E04F 13/0846 52/483.1 |
| 2012/0315081 | A1 | 12/2012 | Bouldin et al. |
| 2016/0237674 | A1 | 8/2016 | Koblasz |
| 2018/0003211 | A1 | 1/2018 | Costabel |
| 2020/0385990 | A1 * | 12/2020 | Dicaire ............ E04B 2/707 |

FOREIGN PATENT DOCUMENTS

| | | |
|---|---|---|
| CA | 166136 S | 1/2017 |
| EP | 3 730 808 A1 | 10/2020 |
| GB | 585 948 | 3/1947 |
| KR | 2 180 618 B1 | 11/2020 |
| NL | 2010093 C2 | 7/2014 |

OTHER PUBLICATIONS

European Patent Office, EPO—Communication Pursuant to Article 94(3) EPC, Sep. 26, 2020, 6 pages, European Patent Office, Netherlands.

* cited by examiner

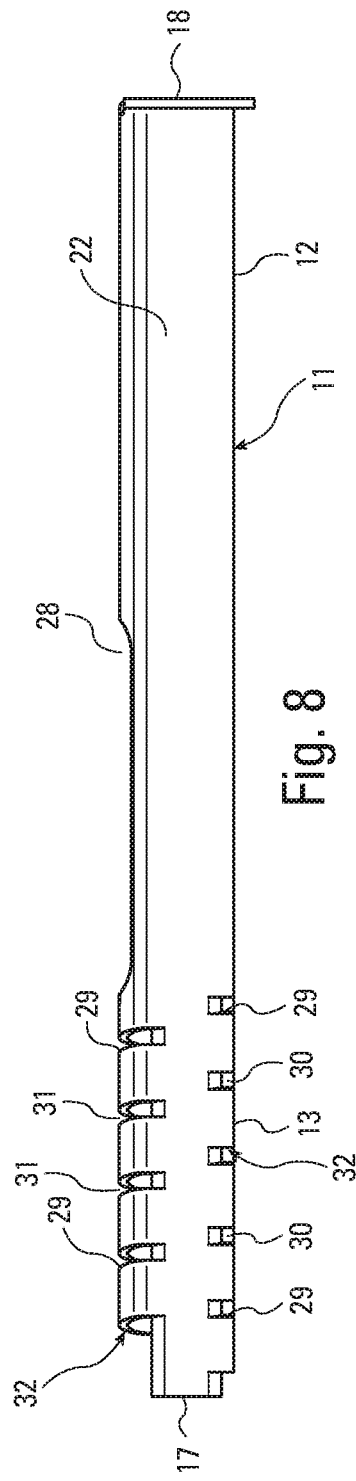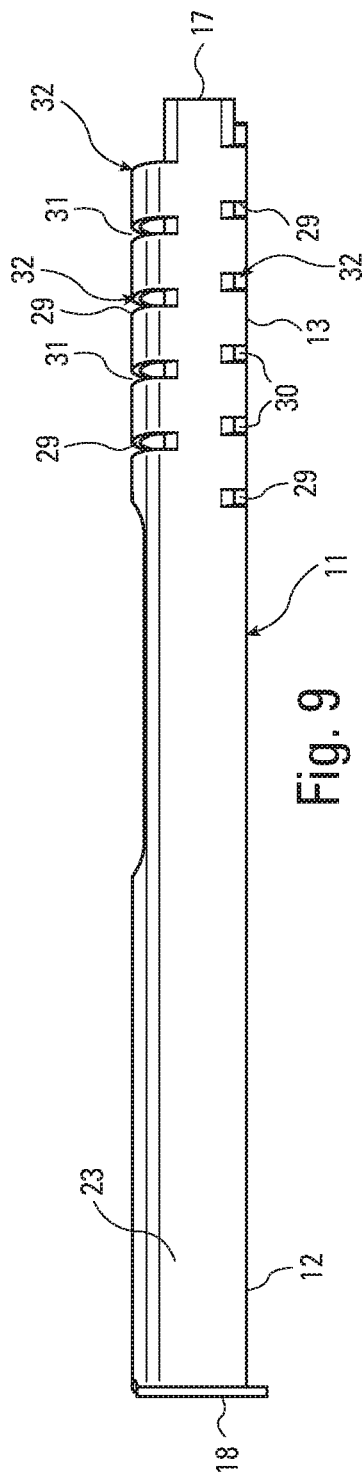

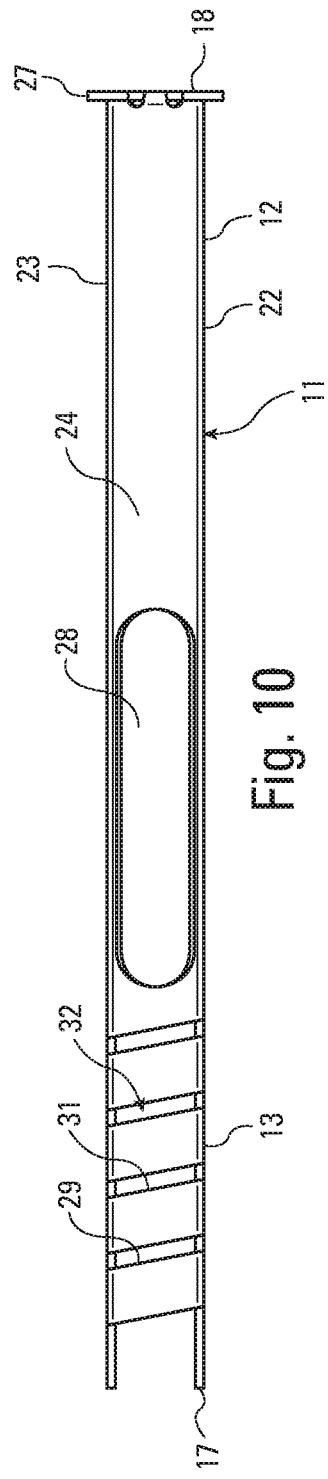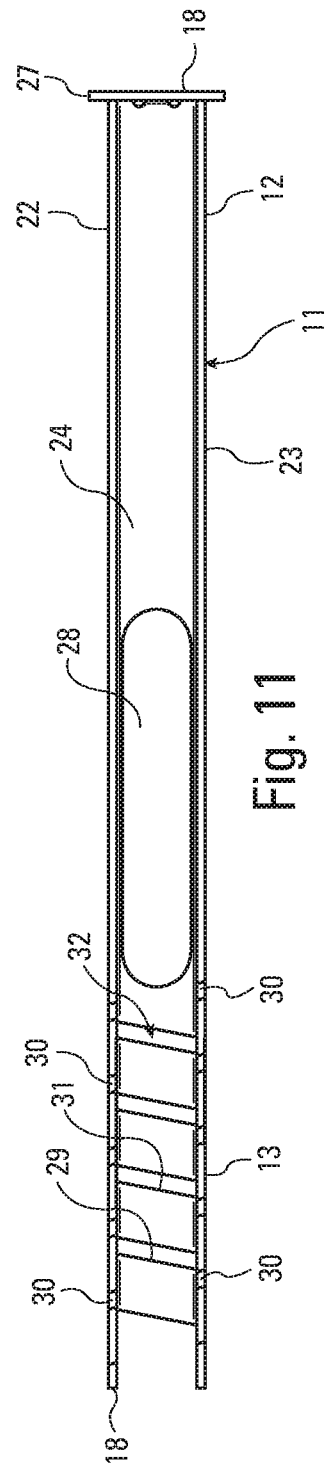

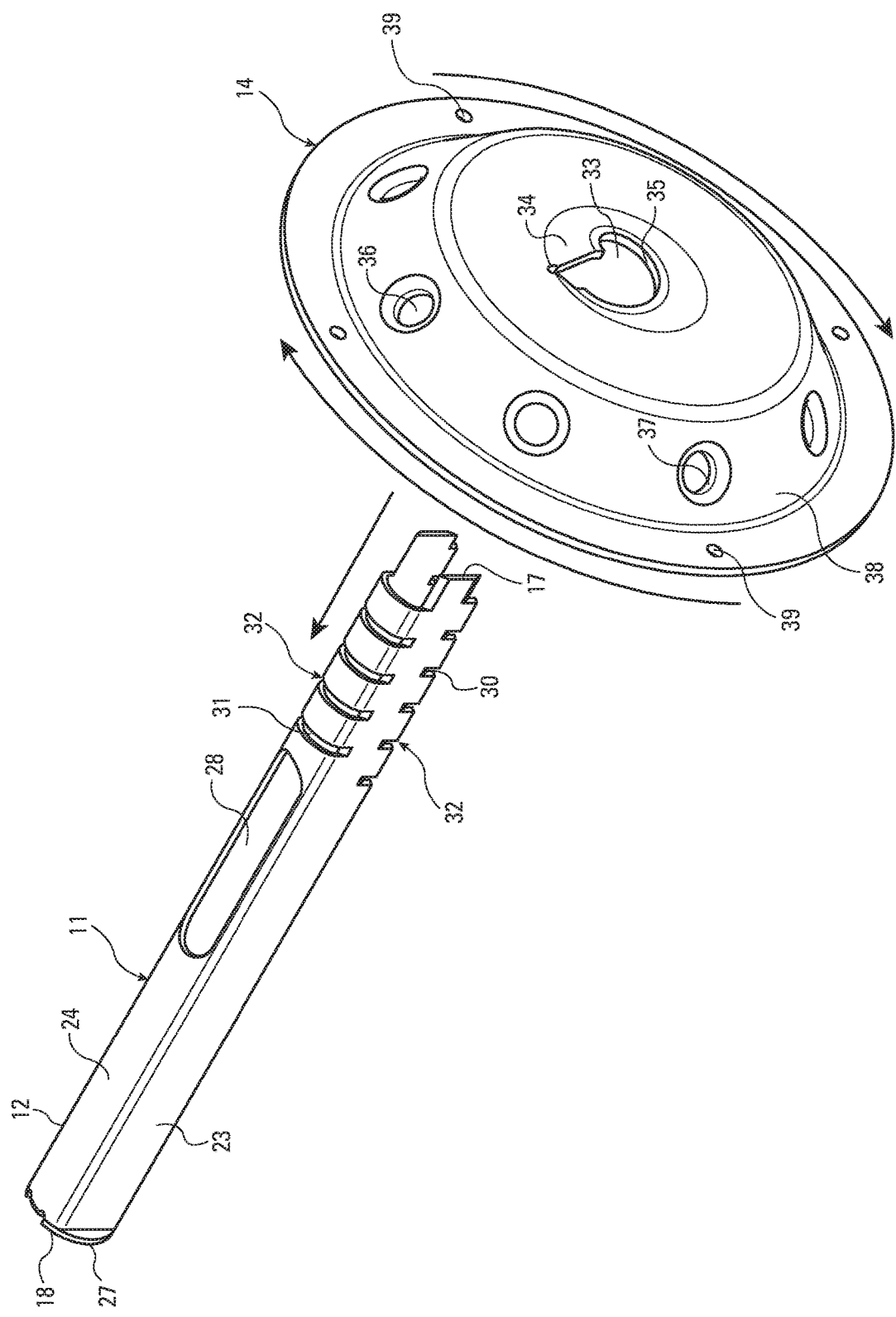

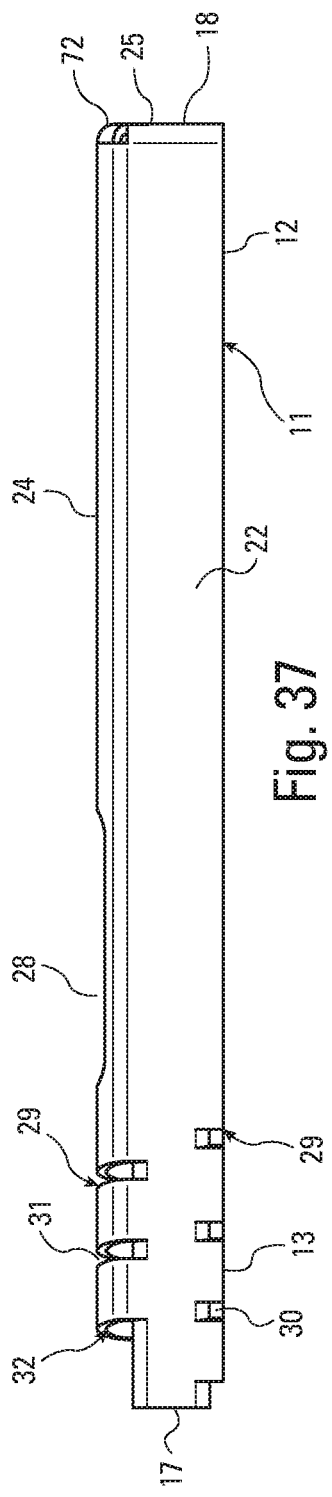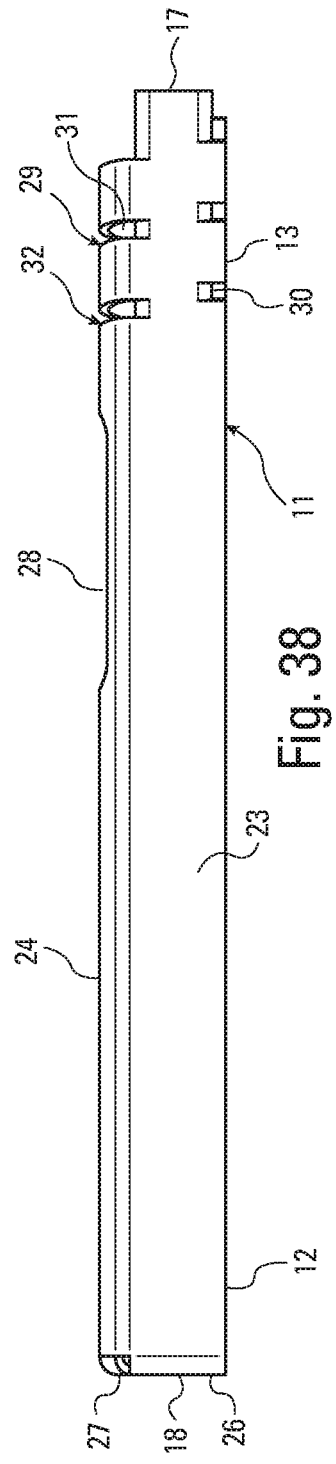

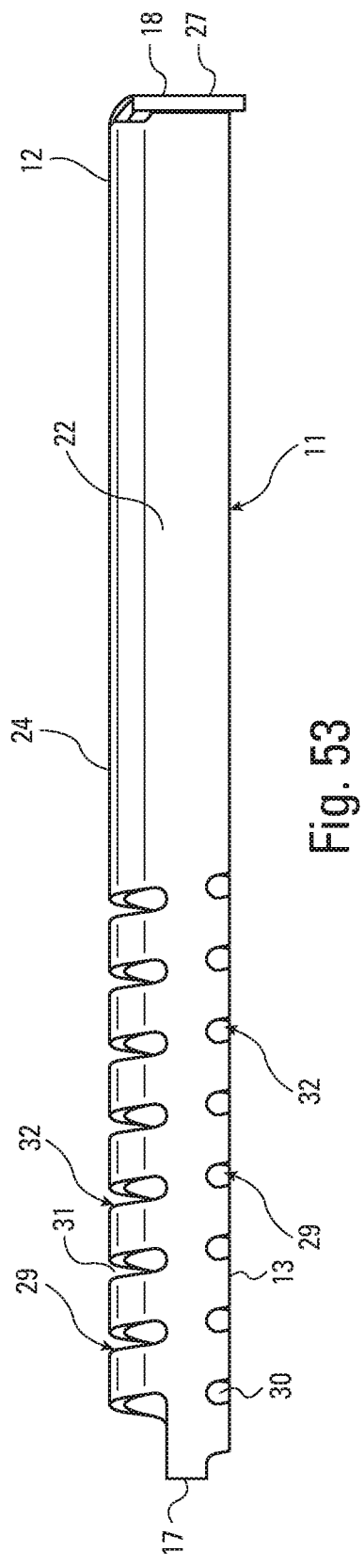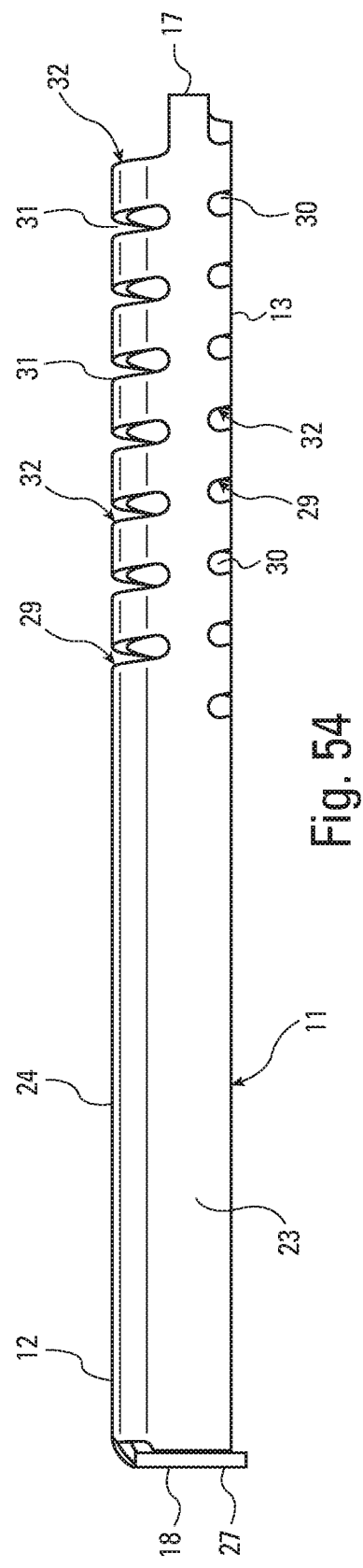

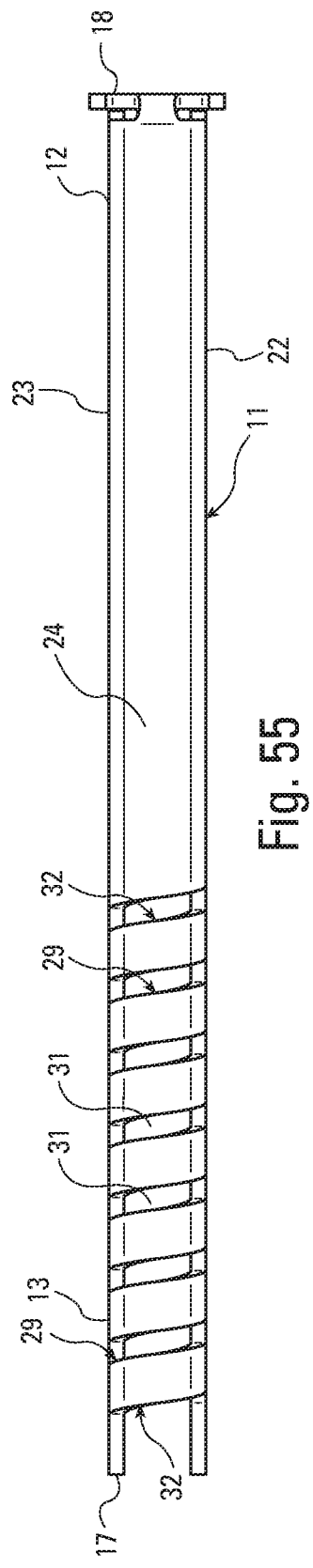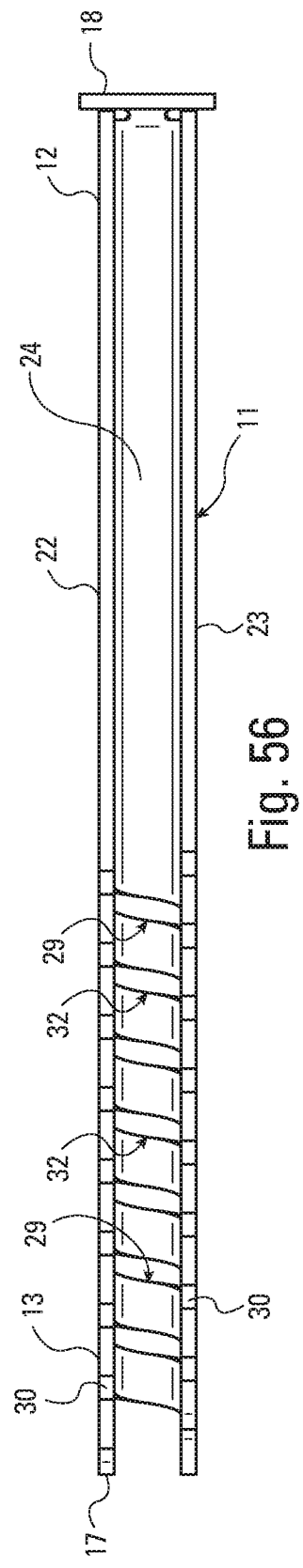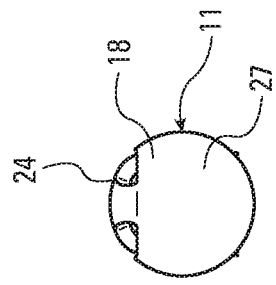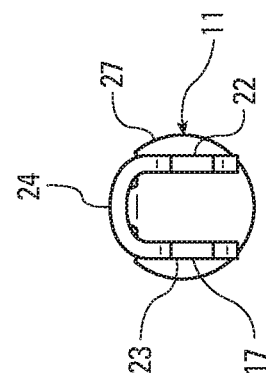

LEDGER CONNECTOR

The present invention relates to a connection between structural members in the interior of a building and another member on the outer side of the building where a siding layer, such as brick veneer, lies between the outer structural member and the interior structural member.

When a structure, such as a deck or shed, outside of the building envelope has a side which is to be supported by, or anchored to a building, it is important to attach the outside structure to a structural wall or other structural member of the building. These structural members of a building are usually located within the building. They are protected by a facade, siding or some other type of outer covering of the building. The attaching elements that make the connection between the two members and penetrate the facade or outer covering of the building need to minimally disturb the facade. The outer covering of the building is typically designed to protect the inner structural frame and living areas of the building from the elements, especially from the intrusion of water. The outer covering of the building can be made from a combination of layers and materials. The materials that make up the outer covering can include asphalt sheathing, insulating boards, vinyl siding, plaster, stucco and bricks. The outer covering can also provide structural protection from flying objects and can help insulate the building.

The outer covering of the building is generally not designed to carry structural loads, so it is also important to avoid loading the outer covering of the building. By avoiding placing loads on the outer covering, the integrity of the veneer is maintained. This helps protect the building from the elements, and helps prevent premature failure of the veneer or outer cover, such as by spalling. The present invention provides a structural attachment of an outer member to the inner structural wall of a building that avoids placing the structural loads on the outer veneer of the building.

There are a number of different devices and methods in the patent prior art for attaching an outer structural member to the inner frame of a building.

US Patent Application 2006/0130414, invented by Mirco Walther teaches adding a spacing member to the common technique of attaching the outer structural member to the interior structural members by means of elongated bolts or screws run through a ledger board on the exterior of the building, the exterior sheathing of the building and into the inner structural wall. Walther teaches that is desirable to hold the outer structural member away from the outer sheathing of the building to prevent the build-up of water and moisture between the outer structural member and the sheathing. Walther's spacer is a simple hollow rectangular bracket made from bent sheet metal that bears against the building surface. The outer structural member or ledger board bears against the rectangular bracket.

U.S. Pat. No. 8,756,871, issued in 2014 to Jeffrey K. Johnson teaches an attachment device that he describes as minimally disturbing the veneer of the building. Johnson characterized his attachment device as being self-sealing at the point of attachment with the inner structural frame of the building. The attachment device is a spacer having two opposed ends, with the inner end abutting the interior structural wall and the outer end being adapted to provide a secure point of attachment for an exterior ledger board or other outer structure. The spacer is disposed in a circular opening made in the outer veneer of the building. The spacer consists of a sealing cup portion and a spacing sleeve. The sealing cup has a bottom wall which sits against the inner structural wall of the building. A peripheral wall rises from the bottom wall. The peripheral wall of the sealing cup receives a spacing sleeve. The spacing sleeve is designed to support a screw fastener that runs from the outer element through the spacing sleeve, the sealing cup portion and into the structural frame. The screw fastener is supported against bending moments by the spacing sleeve and the peripheral outer wall of the sealing cup portion. The sealing cup portion is sealed with the exterior wall finish to prevent the penetration of moisture around the sealing cup portion. The spacer of Johnson is disposed between the interior structural member and the outer, supported member, but does not necessarily space the two apart a selected distance.

U.S. Pat. No. 6,427,391, issued in 2002 to Martin G. Lyons teaches two different attachment devices that have a similar approach to Johnson. Lyons uses interior structural members to support an outer member attached to a building, while holding the outer structural member away from the side face of the building. Like Walther, Lyons teaches that if the outer structural member abuts the side face of the building moisture can be trapped between the outer structural member and the side face of the building. This trapped moisture over time can work its way into the building. Lyon's intention was to create a sufficient gap between the outer structural member and the side face of the building so that moisture will pass between the outer member and the building and not become trapped. Lyons also considered his device to minimally disturb the outer envelope of the building. In the first device taught by Lyons, upper and lower bolts are run through an interior structural member that is parallel with the face of the wall. The bolts protrude through the envelope of the building. The upper bolt is anchored by a strap that is connected to an interior structural member running parallel to the upper bolt to resist moment forces. The outer structural member is held away from the outer face of the building by a series of abutting nuts or spacers threaded onto or surrounding the bolts. The innermost nut abuts the interior structural member and the outermost nut abuts the exterior, supported member. The openings for the bolts and nuts in the outer envelope are then sealed with a caulk or sealant. In the second device taught by Lyons spacers are attached to an interior structural member. The spacers are long enough that one ends abuts the interior member and the other end abuts the outer, exterior member. The body of the spacer passes through the exterior sheathing. The spacer is attached to the interior structural member by fasteners. The spacer has a bore that receives a fastener that can attach to the spacer, or the fastener can pass far enough through the bore to attach to the interior structural member. The fastener can also attach to both. The fastener attaches the outer structural member to the spacer and/or the interior structural member. A sealant is provided around the spacer to try to prevent the entry of water.

U.S. Pat. No. 7,669,373 issued in 2010 to Robert Anthony Muir teaches an attachment device that provides a barrier to the penetration of water. The device consists of a bolt that passes through a plate. The plate acts as a barrier to water trying to penetrate the building. The inner portion of the bolt is attached to the interior structural framing of the building. The outer portion of the bolt is attached to the outer structural member. The plate is disposed underneath the sheathing or cladding of the building so that any water that runs along the outer bolt past the outer sheathing toward the interior of the building will encounter the plate. The plate is formed with a sloped ledge at its lower edge that juts out of the cladding of the building. Muir thought much of the water that reached the plate would run down the plate to the ledge where it would then be transported out of the building envelope. Muir also provides a packing block or spacer attached to the outer portion of the bolt. The spacer abuts the plate, and the outer structural member can abut the spacer. The spacer thus creates a minimum distance between the plate and the outer structural member. The plate is itself disposed in facing relation with building paper that is laid over the wall framing of the building. Thus the outer structural member abuts the spacing block which abuts the plate which abuts the interior framing.

SUMMARY OF THE INVENTION

It is an object of the present invention to provide a connection and a method of attaching a member located on the outside of a building to the inner structural frame or other inner structural member of a building without placing bearing loads on the veneer or facade of the building.

It is an object of the present invention to provide an attachment and a method of making the attachment that minimally disturbs the veneer and any water proofing of the building. The present invention can accommodate facades of different sizes and facades spaced at different distances from the inner structural members of the building.

It is an object of the present invention to provide a connection and a method of attaching a member located on the outside of a building to the inner structural fame of a building that is amenable to current building practices.

It is an object of the present invention to provide an apparatus that is easily installed to make the connection, and can be installed in a retrofit installation.

It is an object of the present invention to hold the outer member a selected distance along the compression strut or bracing member without needing to provide a spacer that both the anchoring interior member and the anchored exterior member abut. Typically, in the prior art a spacer holds or spaces the outer structural member away from the inner structural member by being interposed between the outer and inner members with the two members abutting the spacer. It is a further object of the present invention to provide a compression strut that can hold the outer member at different locations or selected distances along the compression strut when used with a connection plate. The connection plate of the present invention which is attached to the outer member can be placed at different locations on the compression member and maintain a selected position along the compression member when under load. The compression strut is provided with catches or stops along its location that can be engaged by the connector plate and thereby hold the connector plate in place.

It is an object of the present invention to provide a connection where the tension fasteners used are not disposed parallel to the compression strut. The compression strut is disposed generally orthogonally to the vertically disposed exterior wall against which it abuts, and the one or more tension fasteners extend through the connector plate and the ledger board and into the one or more inner structural members of the exterior wall at an acute angle to both the compression strut and the vertical face of the wall. This angle is preferably 40 degrees upward from the horizontally disposed compression strut.

BRIEF DESCRIPTION OF THE DRAWINGS

FIG. 8 is a right side view of one embodiment of the compression strut of the present invention.
FIG. 9 is a left side view of the compression strut of FIG. 8.
FIG. 10 is a top view of the compression strut of FIG. 8.
FIG. 11 is a bottom view of the compression strut of FIG. 8.
FIG. 12 is a front view of the compression strut of FIG. 8.
FIG. 13 is a back view of the compression strut of FIG. 8.
FIG. 14 is a perspective view of the compression strut of FIG. 8 and the connector plate of FIG. 1, showing the connector plate about to be rotated onto the compression strut.

FIG. 37 is a right side view of the compression strut of FIG. 36.

FIG. 38 is a left side view of the compression strut of FIG. 36.

FIG. 39 is a back end view of the compression strut of FIG. 36.

FIG. 40 is a front end view of the compression strut of FIG. 36.

FIG. 53 is a right side view of another embodiment of the compression strut of the present invention that is used with the connector plate of FIG. 46.

FIG. 54 is left side view of the compression strut of FIG. 53.

FIG. 55 is a top view of the compression strut of FIG. 53.

FIG. 56 is a bottom view of the compression strut of FIG. 53.

FIG. 57 is a front view of the compression strut of FIG. 53.

FIG. 58 is a back end view of the compression strut of FIG. 53.

DETAILED DESCRIPTION OF THE INVENTION

Figure 16:
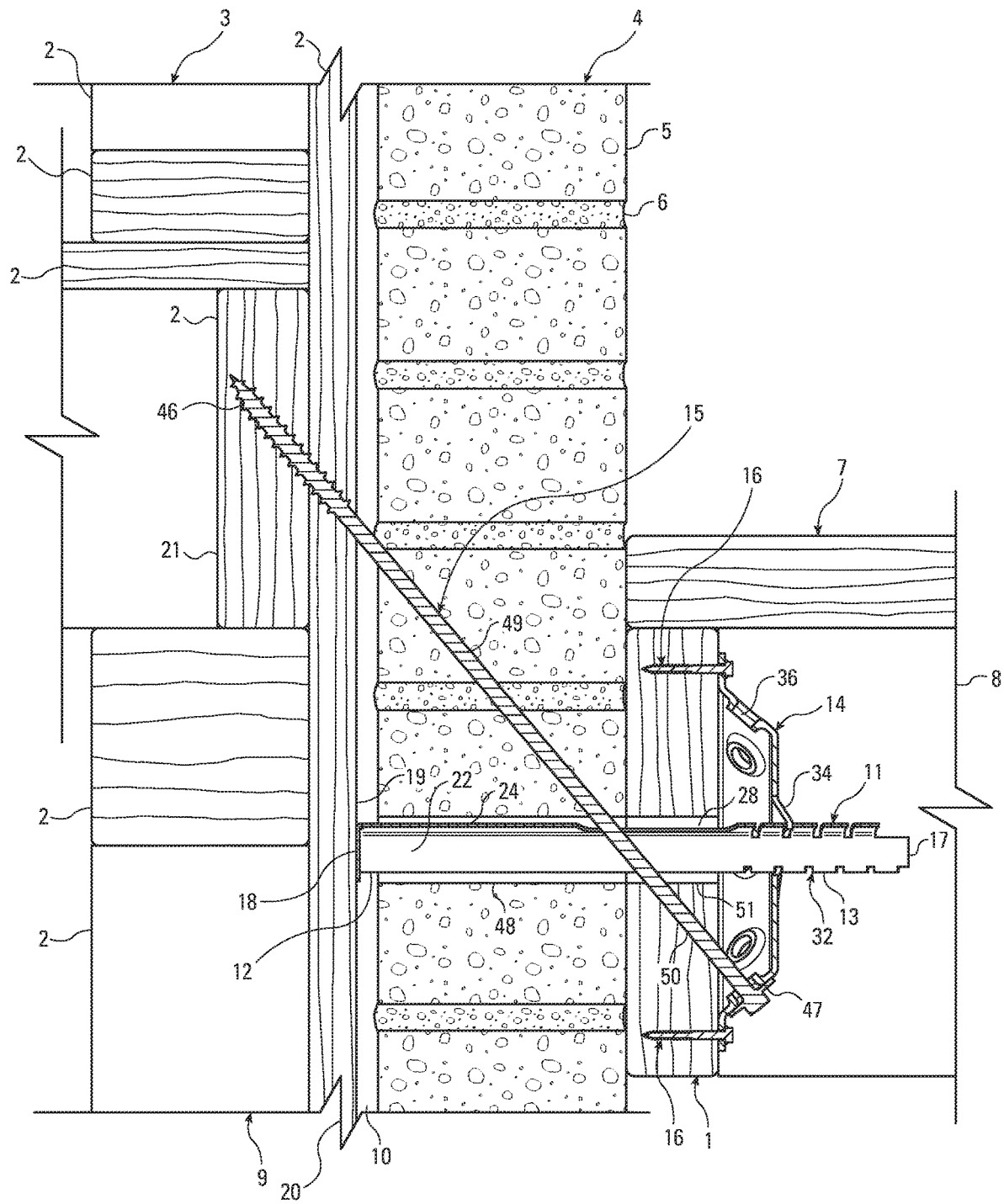
FIG. 16 is a cross-sectional side view of the connection of the present invention.

As shown in FIG. 16, a connection is formed between an outer member 1 and one or more inner structural members 2. As shown in FIG. 16, the one or more inner structural members 2 are located within the interior of a building 3 with an outer covering or veneer 4 of bricks 5 and mortar 6 located between the outer member 1 and the one or more inner structural members 2. In FIG. 16, the outer member 1 is the ledger board for an exterior deck 7. A deck joist 8 is shown extending from the ledger board 1.

As shown in FIG. 16, the one or more inner members 2 make up the framing of a building 3 located within the building envelope. The framing shown makes up what is called an exterior wall 9 of the building 3. Despite being called an exterior wall 9, the wall is located within the building and is protected from the elements outside by the brick veneer 4. The exterior walls of a building 3, as opposed to interior walls, are located at the periphery of the building 3 and are disposed between an outside space and an inside space. Interior walls of a building 3 divide inside spaces of the building 3. As shown in FIG. 16 an air gap 10 can be provided between the brick veneer 4 and the exterior wall 9 of the building 3.

Figure 61:
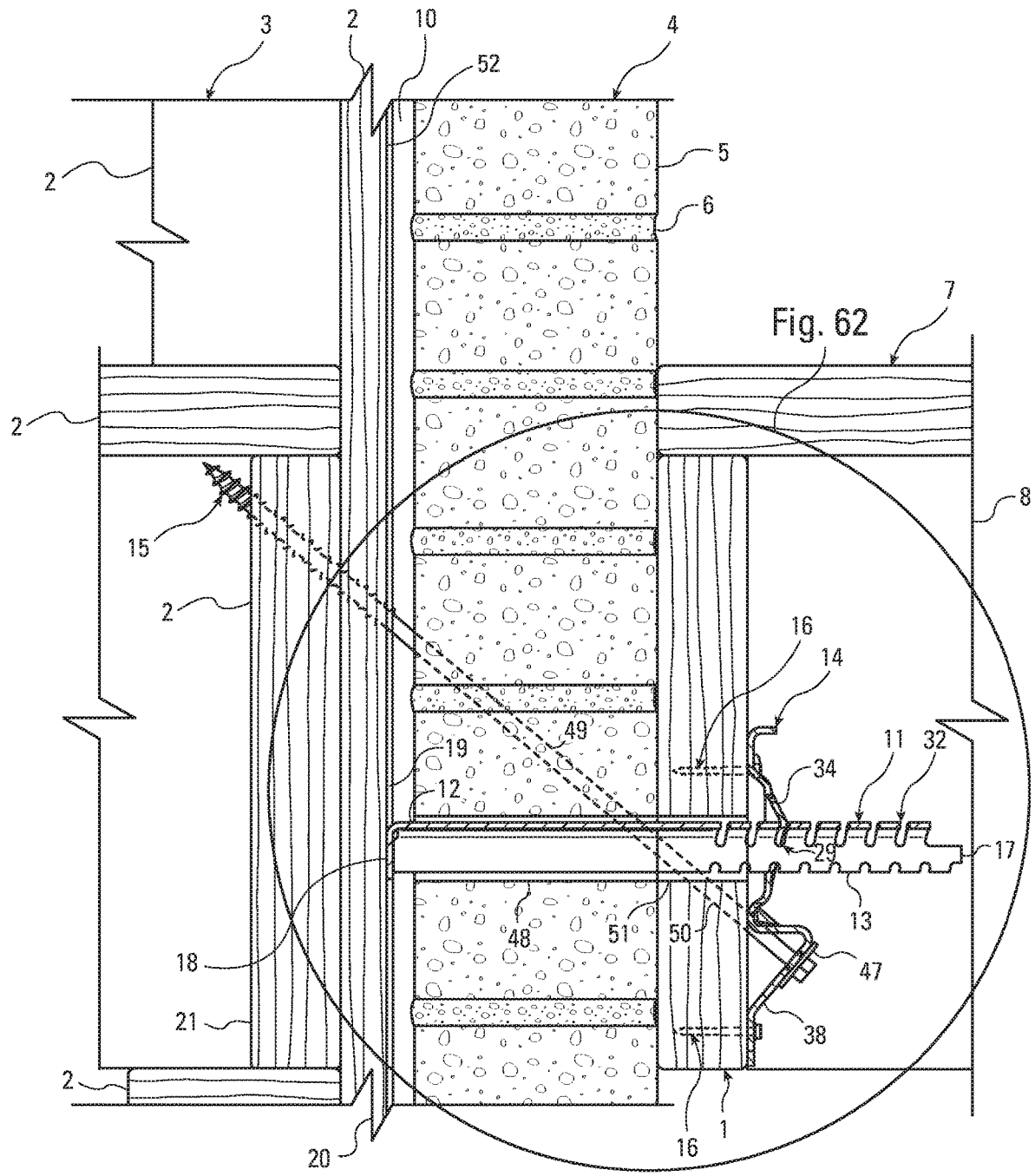
FIG. 61 is a cross-sectional side view of the connection of the present invention made with the compression strut and connector plate of FIG. 59.

As shown in FIG. 61, the connection between the outer member 1 and the one or more inner structural members 2, uses an elongated compression strut 11 having an inner portion 12 and an outer portion 13, the inner portion 12 being in engagement with one of the one or more inner structural members 2, the outer portion 13 being inserted though and connected to the outer member 1. The elongated compression strut 11 holds the outer member 1 away from the one or more inner structural members 2. The connection also uses a connector plate 14 that engages the compression strut 11 and the outer member 1. The connector plate positively attaches the compression strut 11 to the outer member 1. One or more tension fasteners 15 attach the connector plate 14 to one or more of the one or more inner structural members 2. Preferably, the one or more tension fasteners 15 are not parallel with the elongated compression strut 11.

As shown in FIG. 61, in the preferred embodiment, one or more connection fasteners 16 attach the connector plate 14 to the outer member 1. In the preferred embodiment, the outer portion 13 of the compression strut 11 holds the connector plate 14 at a selected location along the compression strut 11 that is not the outer end 17 of the compression strut 11. As also shown in FIG. 61, the compression strut 11 extends horizontally from the one or more inner structural members 2 and the one or more tension fasteners 15 extend upwardly at an acute angle to the horizontally disposed compression strut 11 toward the one or more inner structural members 2. The inner portion 12 of the compression strut 11 has an inner end 18 that abuts a side surface or outer face 19 of one of the one or more inner structural members 2.

As shown in FIG. 16, the compression member 11 preferably abuts the outer face 19 of the framing of the exterior wall 9 of the building 3. As shown the inner structural member 2 that makes the outer face can be structural sheathing 20 such as oriented strand board or plywood or other similarly strong material. The compression strut 11 could have a mechanism at its inner end 18 for attaching the compression strut 11 to one of the one or more inner structural members 2 where it abuts the exterior wall 9. However, by having the compression strut 11 abut an inner structural member 2 it is easier to know how far the compression strut 11 will extend outwardly from the interior structural members 2 when it is installed.

As shown in FIG. 61, the compression strut 11 transfers compression forces from the outer member 1 or ledger plate to the one or more inner structural members 2 which as shown are the sheathing 20 backed by a rim joist 21. The compression strut 11 is formed as single, unitary piece and a u-shaped channel. Preferably, the compression strut 11 is oriented so that the open portion of the u-shaped channel extends downwardly so as to shed water; however, the orientation of the channel will depend on the location of the elements. Weep holes can be formed in the compression strut to shed water. As shown in FIGS. 37-40, the walls 22 and 23 web 24 of the channel of the inner portion 12 of the compression strut 11 can be formed with corresponding end flanges 25, 26 and 27 to allow for greater bearing surface against the one or more inner structural members 2. As shown in FIGS. 8, 10, 15 and 16, the compression strut 11 in certain instances is also formed with a longitudinal opening 28 that can receive the angled tension fastener 15 therethrough.

As shown in FIG. 8, the outer portion 13 of the compression strut 11 is preferably formed with one or more catches 29 that can hold the connector plate at various locations along the length of the compression strut 11. The catches 28 as shown in FIG. 8 are a series of notches 30 and elongated openings 31 in the walls 22 and 23 and web 24 of the compression strut 11. The elongated openings 31 are angled with respect to the length of the compression strut 11. The notches can also have angled walls. Preferably, the notches 30 and elongated openings are arranged in a broken helical pattern to create a track 32, so that the connection plate 14 and the compression strut 11 can be rotated with respect to each other when the connector plate 14 is engaged with the compression strut at a compression strut opening 33 formed in the connection plate 14. Rotating the compression strut 11 in the compression strut opening 32, or rotating the connection plate 14 around the compression strut 11 when the compression strut opening 32 is engaged with the compression strut 11 moves or translates, the connection plate 14 along the compression strut 11, changing the position of the connection plate 14 on the compression strut 11. By using a helical track 32 the position of the connector plate 14 on the compression strut 11 can be set anywhere along the track 32, accommodating variations in the distance between the outer member 1 and the one or more inner structural members 2. This allows for close tolerances between the elements of the invention and helps to transfer structural loads between the elements.

As shown in FIG. 14, in the preferred embodiment, the compression strut opening 33 in the connection plate 14 is formed with a one or more flanges 34 with a compression opening edge 35 to engage with the track 32. As shown in FIG. 14, a single flange can be provided in the shape of a helix. Preferably, the helical flange 34 engages with a plurality of catches 29 on the compression member. In the most preferred embodiment, the helical flange 34 engages with an elongated opening 31 on the web 24 of the channel and a notch 31 on each of the walls 23 and 23 of the channel. The catches 29 engage both sides of the flange 34.

Figure 1:
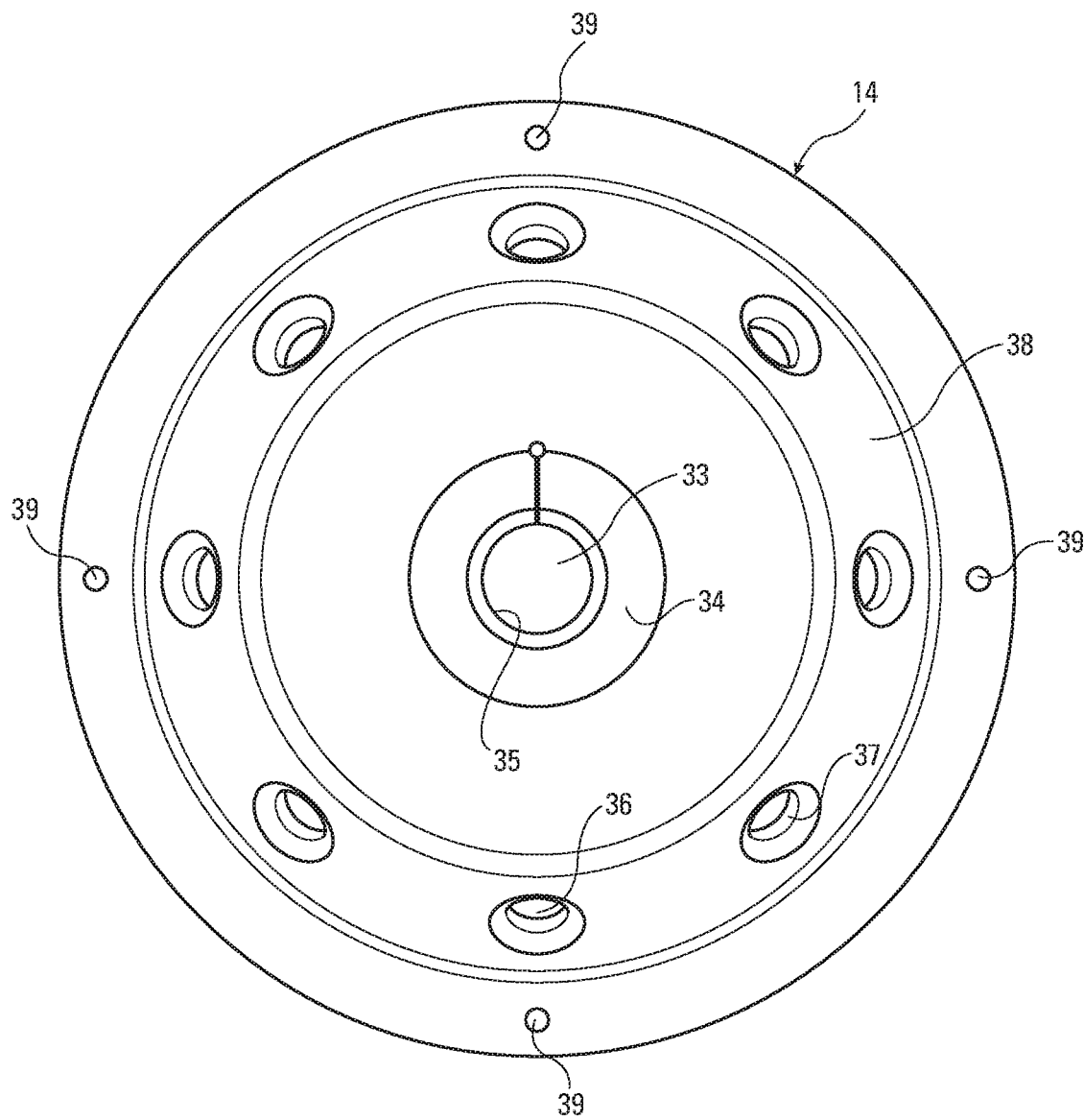
FIG. 1 is a front view of one embodiment of the connector plate of the present invention.
Figure 2:
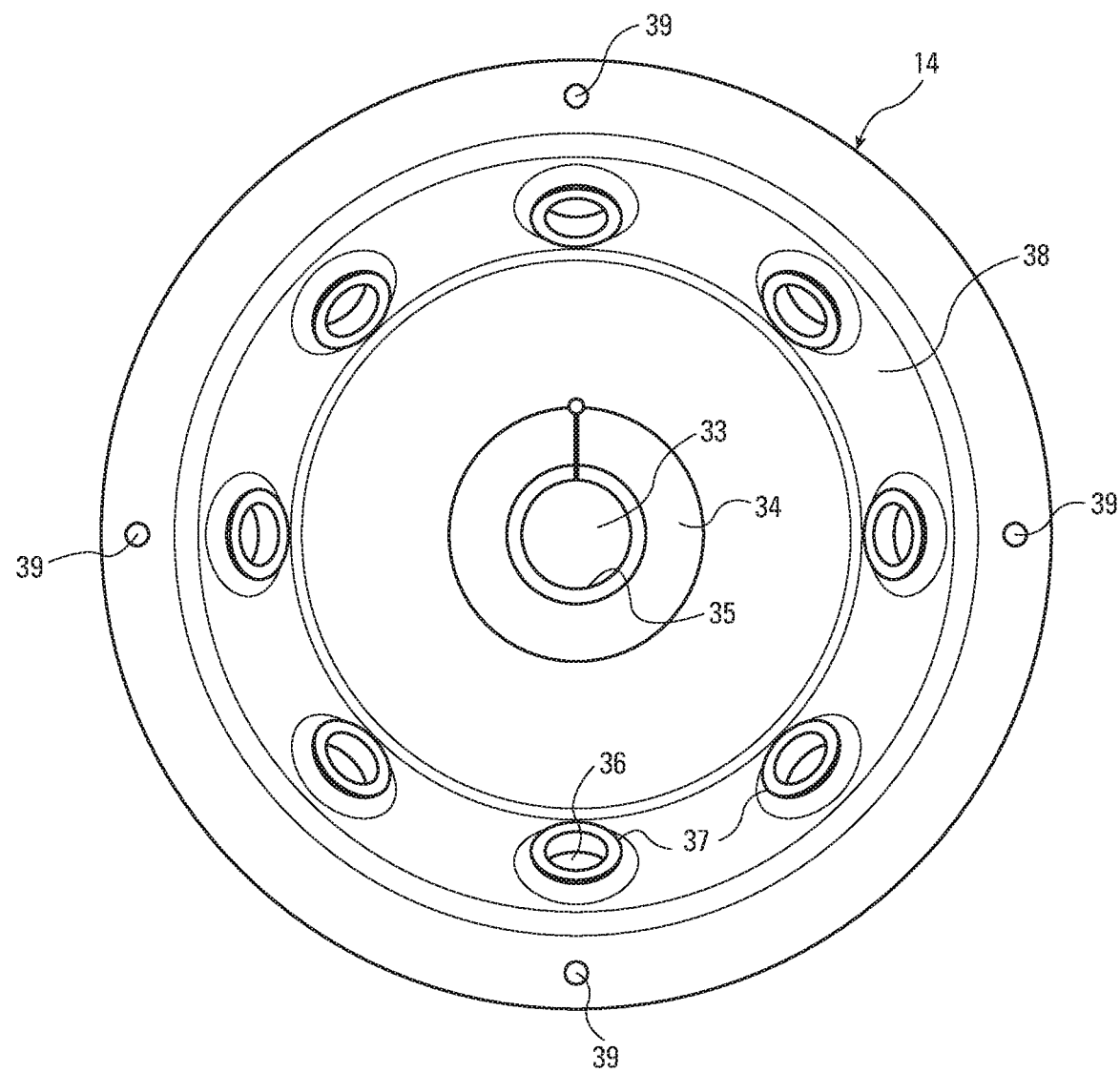
FIG. 2 is a back view of the connector plate of FIG. 1.
Figure 3:
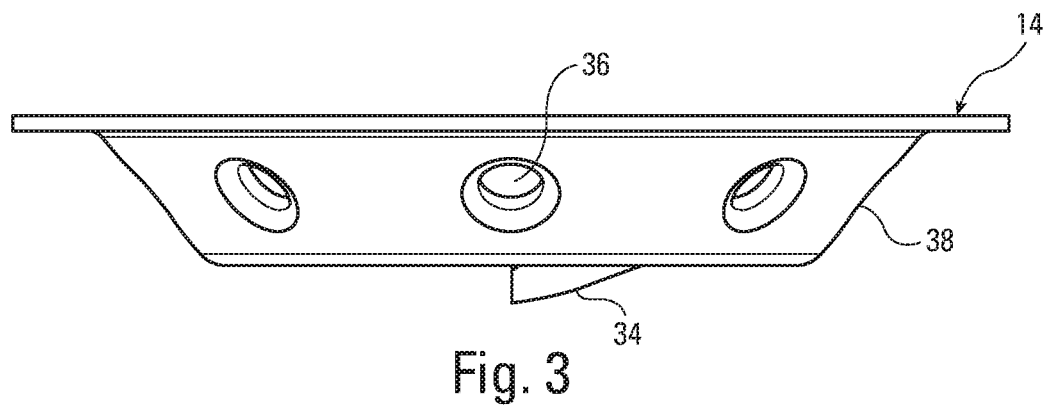
FIG. 3 is a top view of the connector of plate of FIG. 1.
Figure 4:
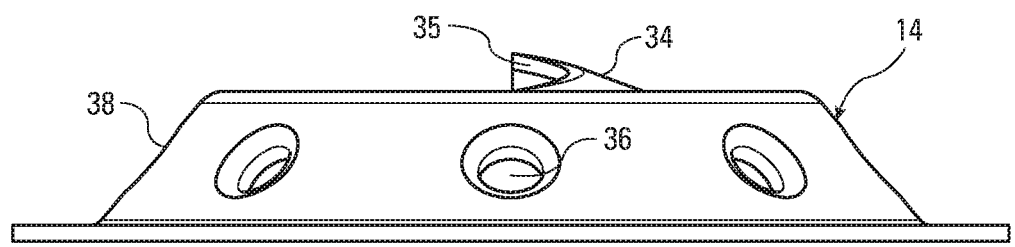
FIG. 4 is a bottom view of the connector plate of FIG. 1.
Figure 5:
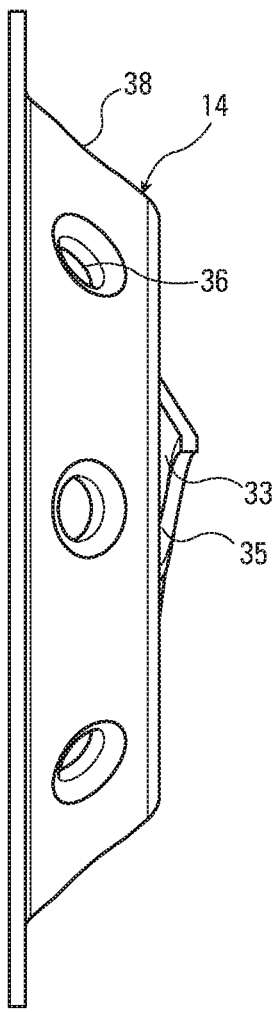
FIG. 5 is a left side view of the connector plate of FIG. 1.
Figure 6:
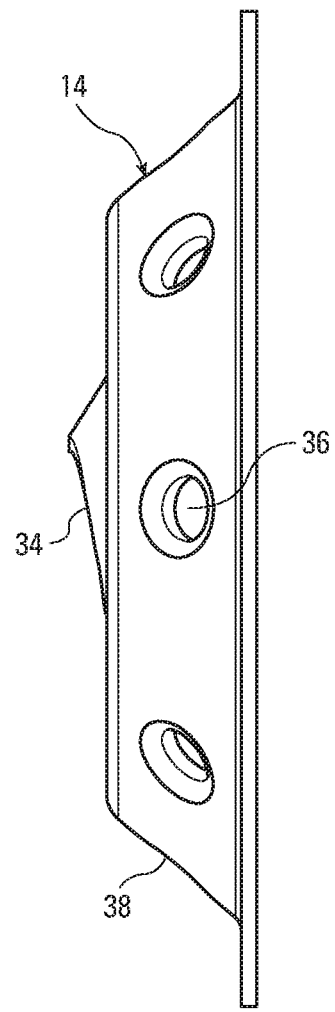
FIG. 6 is a right side view of the connector plate of FIG. 1.
Figure 7:
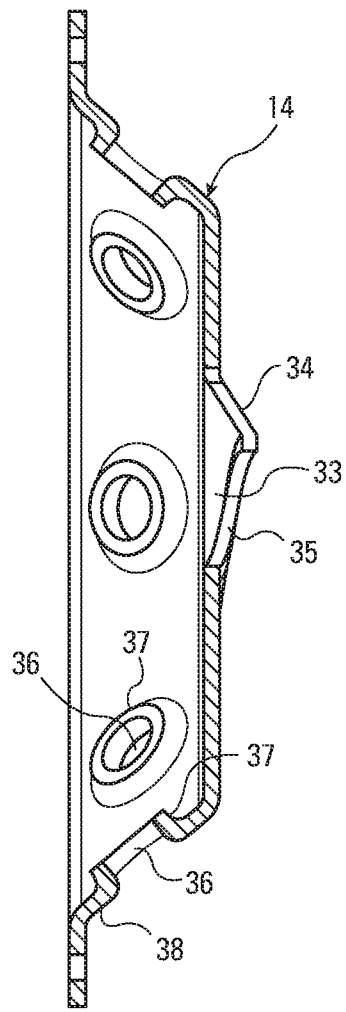
FIG. 7 is a cross-sectional, side view of the connector of FIG. 1.
Figure 15:
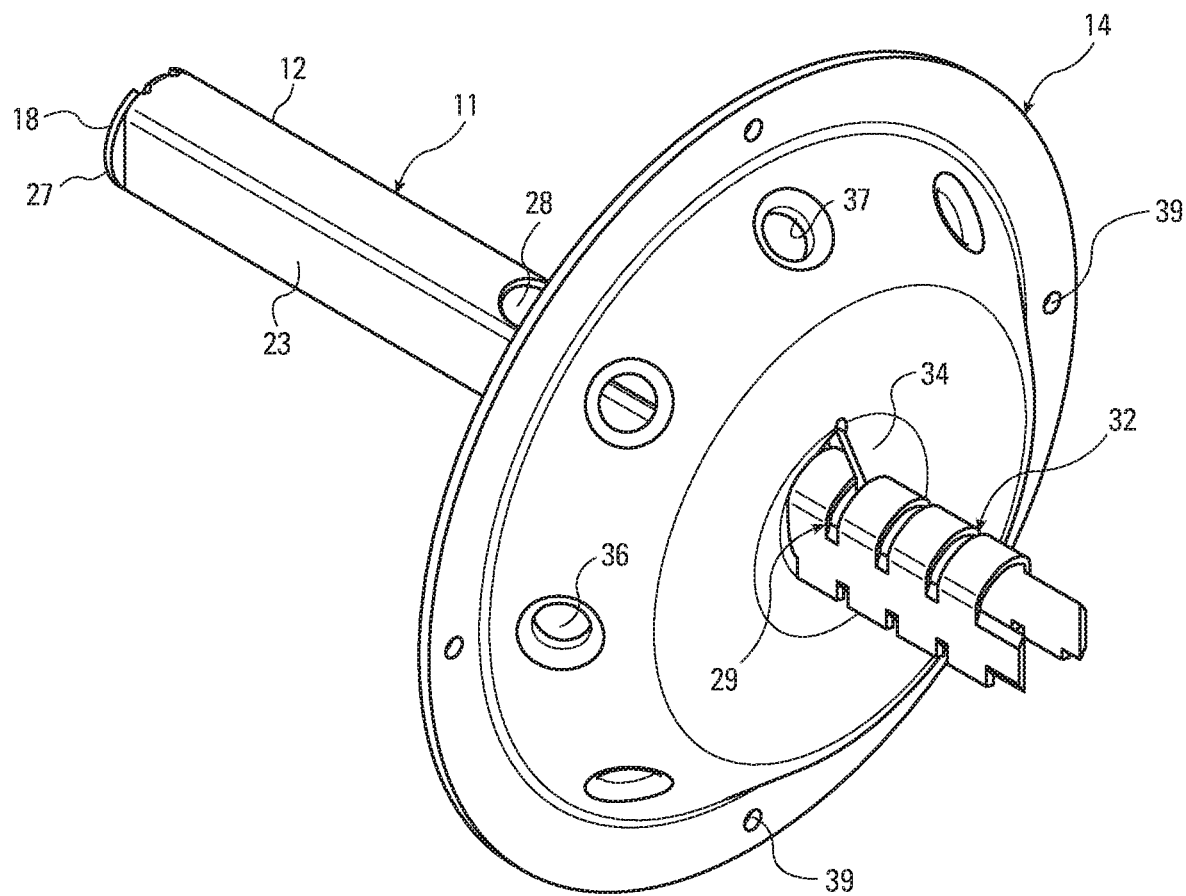
FIG. 15 is a perspective view of the connection plate and compression strut of FIG. 14 with the connection plate joined to the compression strut.
Figure 17:
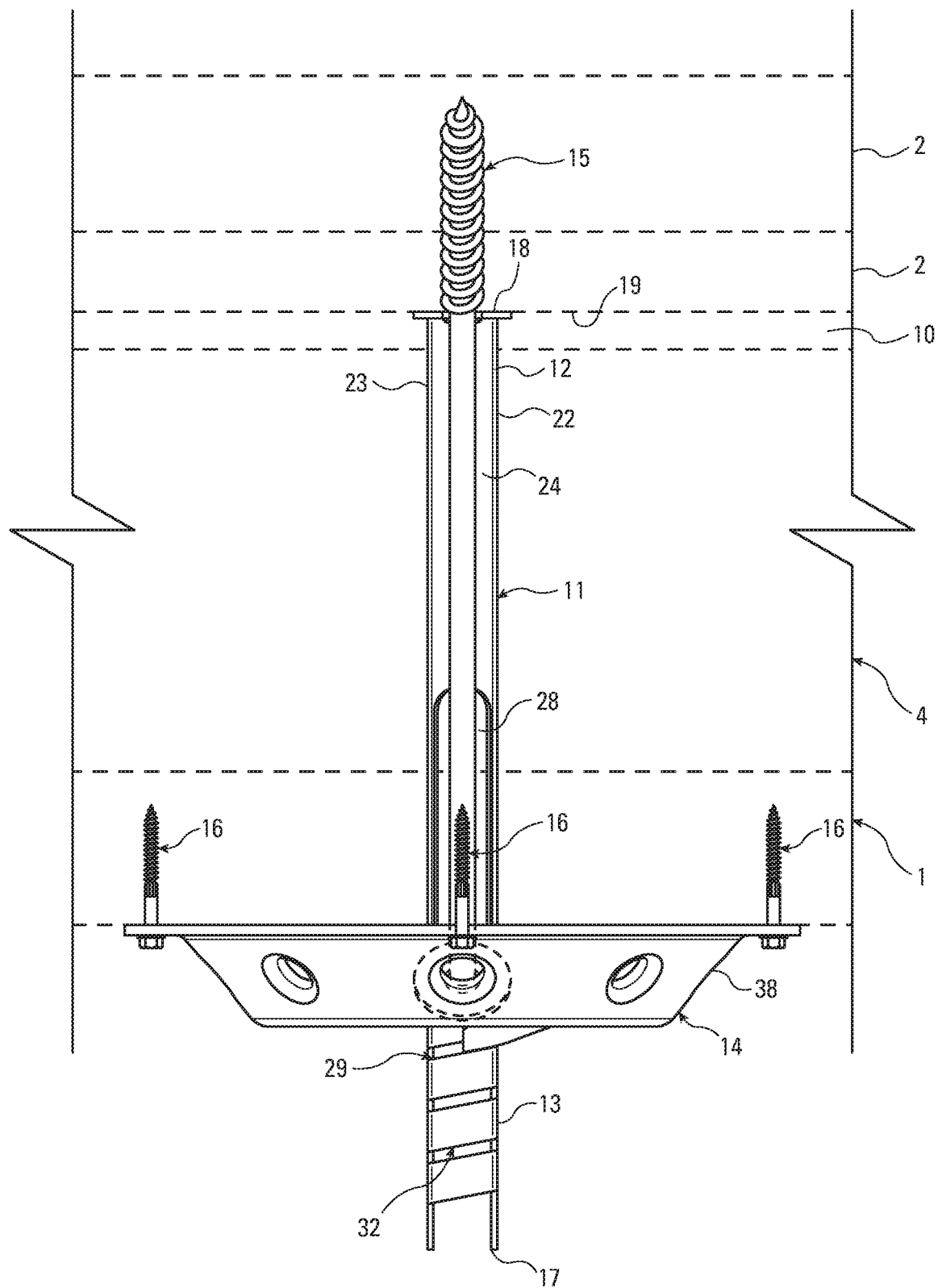
FIG. 17 is a top view of the connection shown in FIG. 16 with the boundaries of the outer member, the brick facade and the inner structural members shown in dotted lines.
Figure 18:
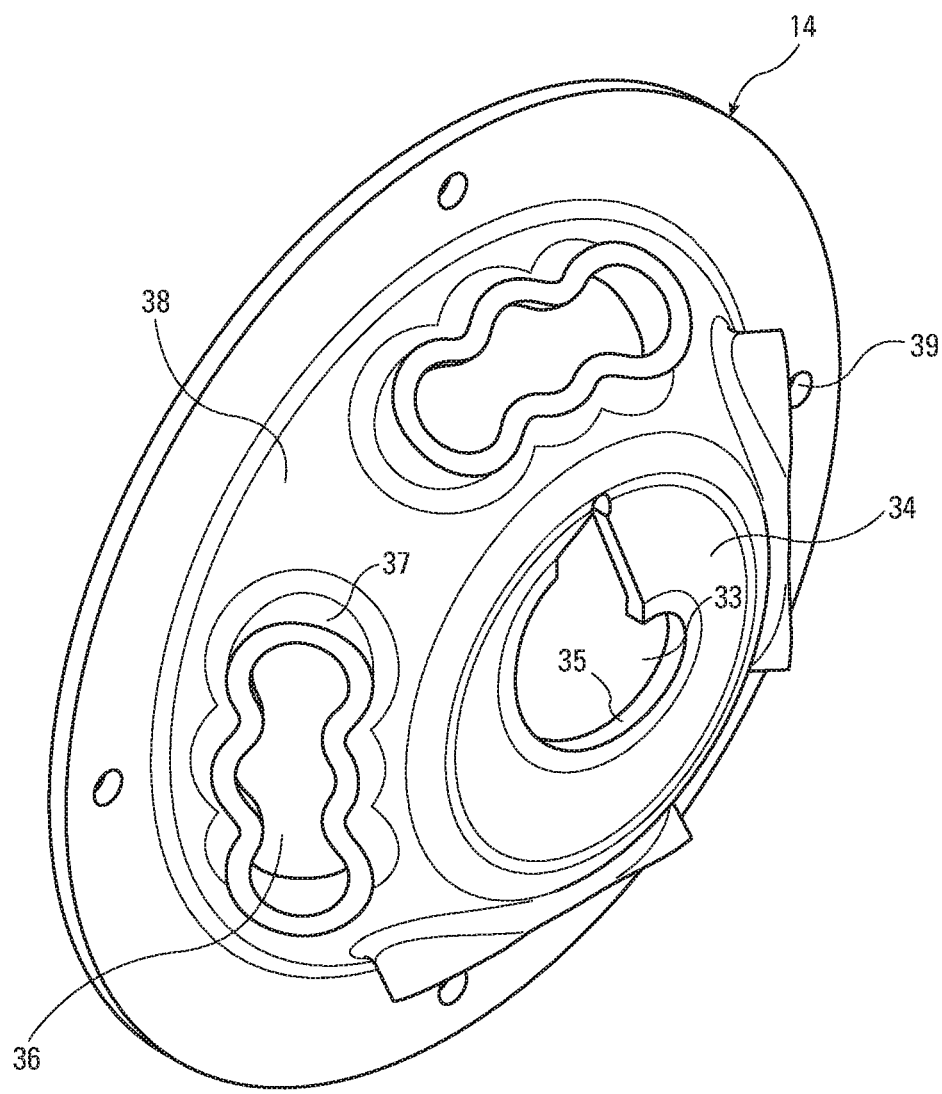
FIG. 18 is a perspective view of a second embodiment of the connector plate of the present invention.
Figure 19:
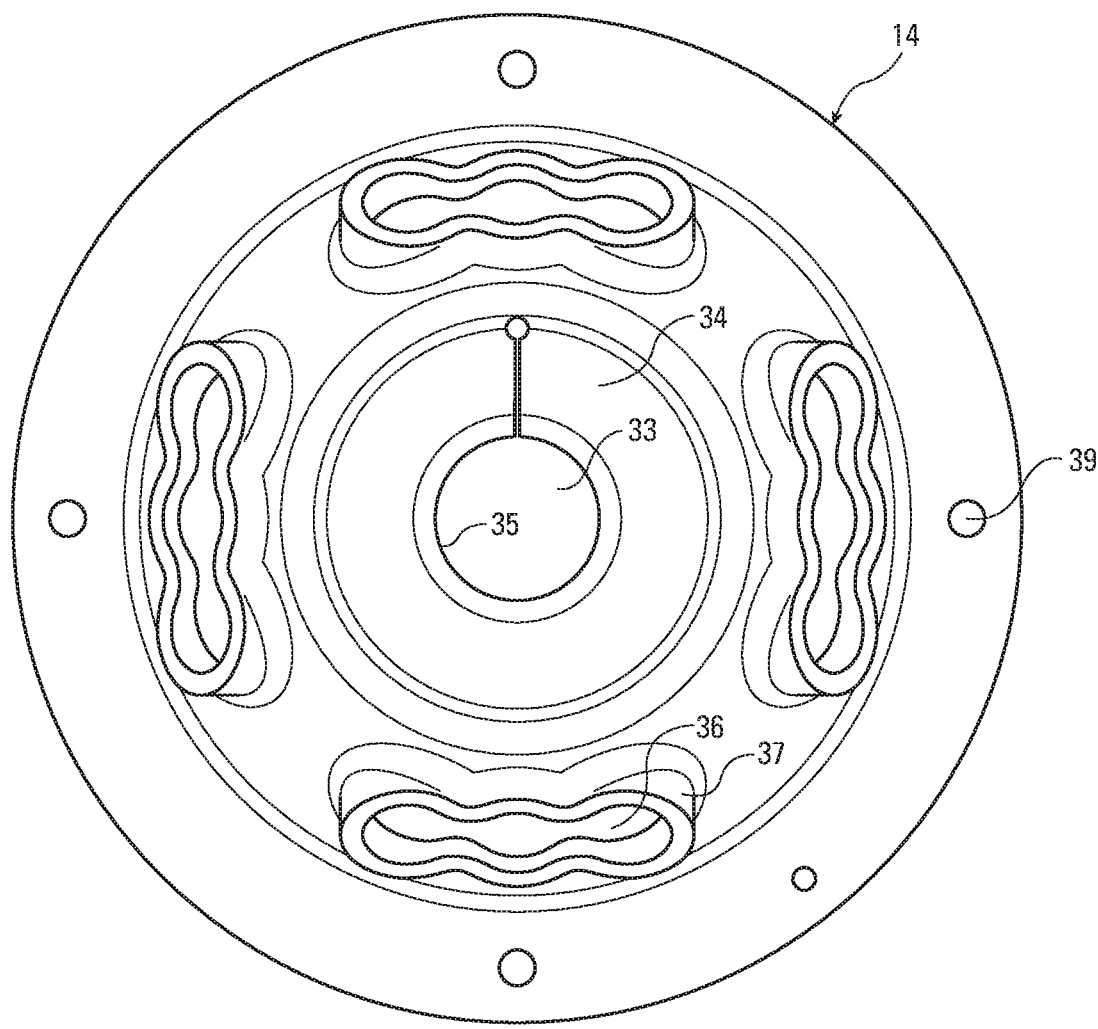
FIG. 19 is a front view of the connector plate of FIG. 18.
Figure 20:
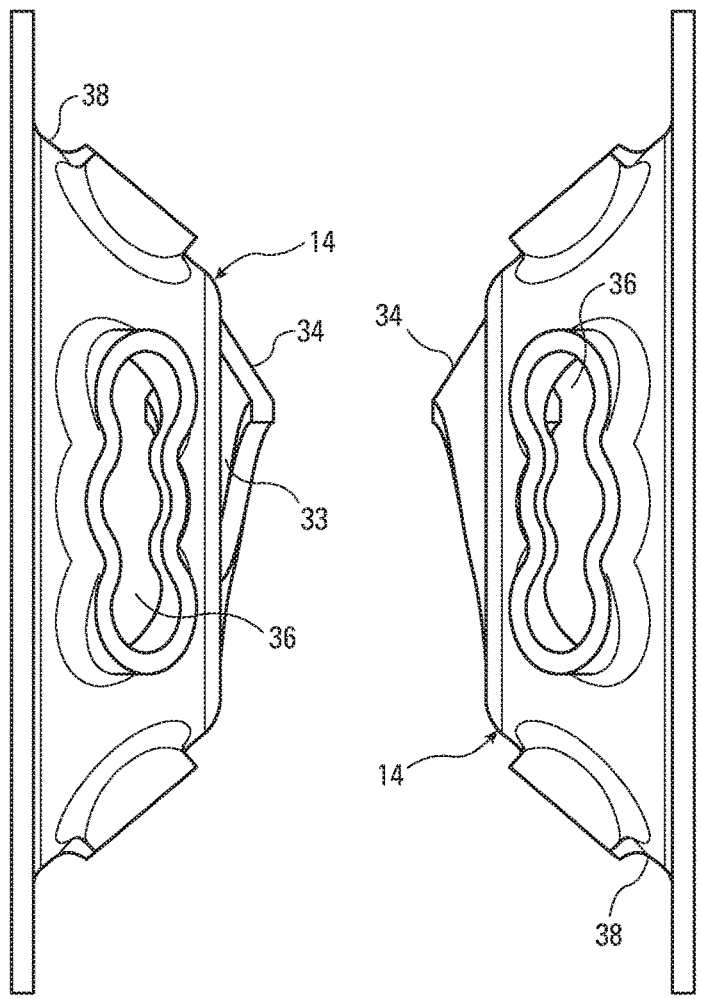
FIG. 20 is a left side view of the connector plate of FIG. 18.
Figure 21:
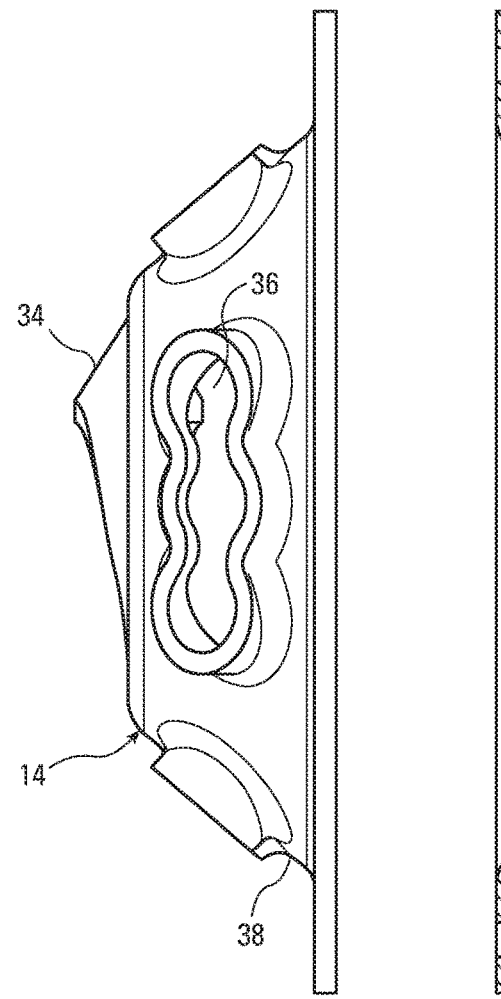
FIG. 21 is a right side view of the connector plate of FIG. 18.
Figure 22:
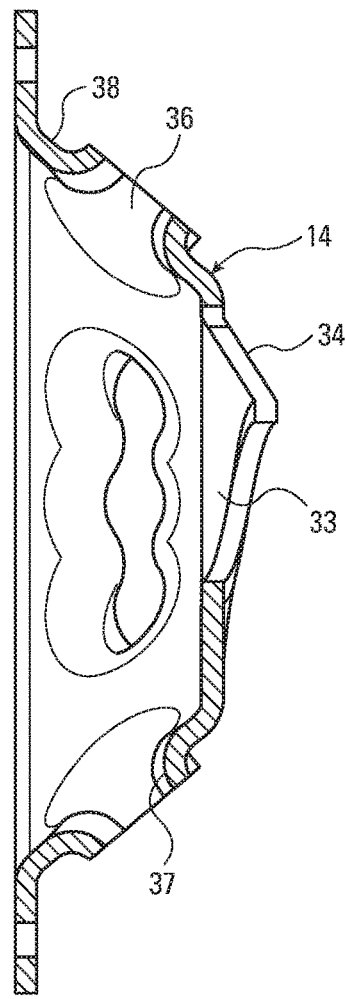
FIG. 22 is a cross-sectional, side view of the connector plate of FIG. 18.
Figure 23:
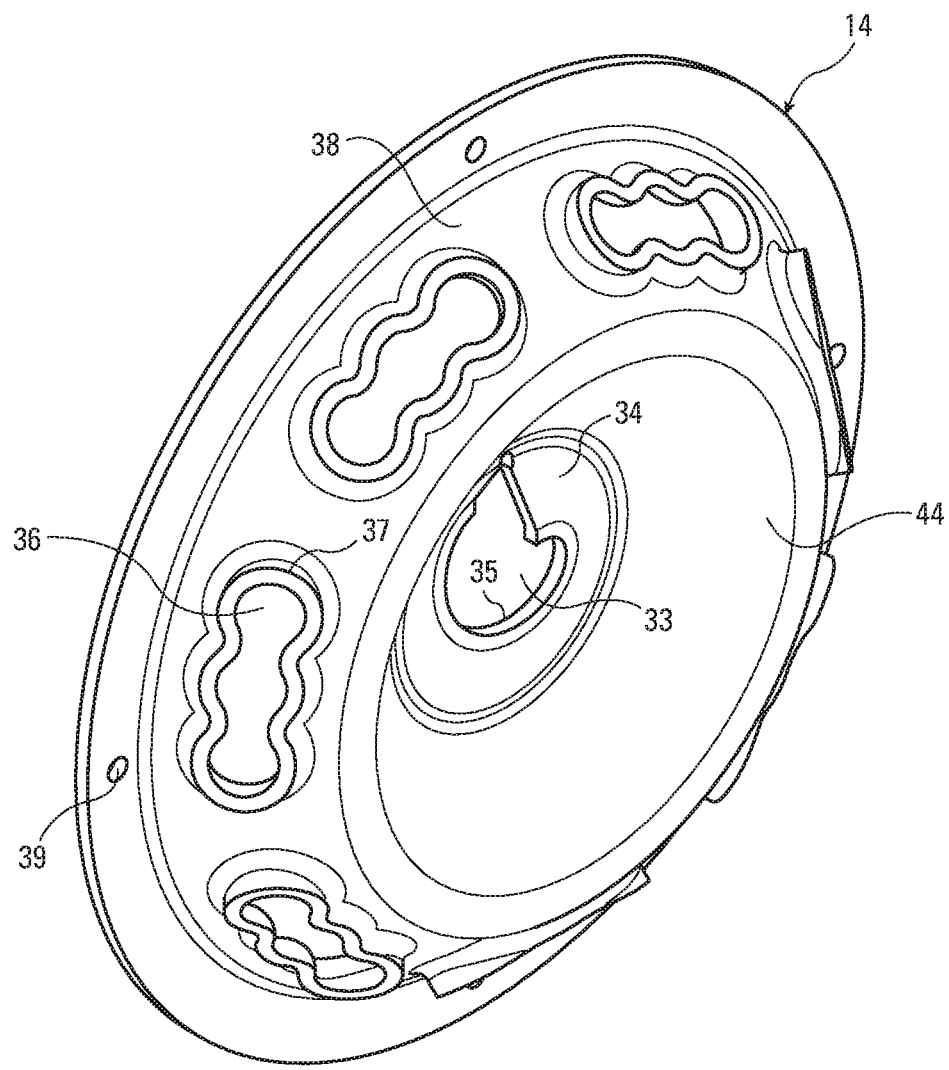
FIG. 23 is a perspective view of a third embodiment of the connector plate of the present invention.
Figure 24:
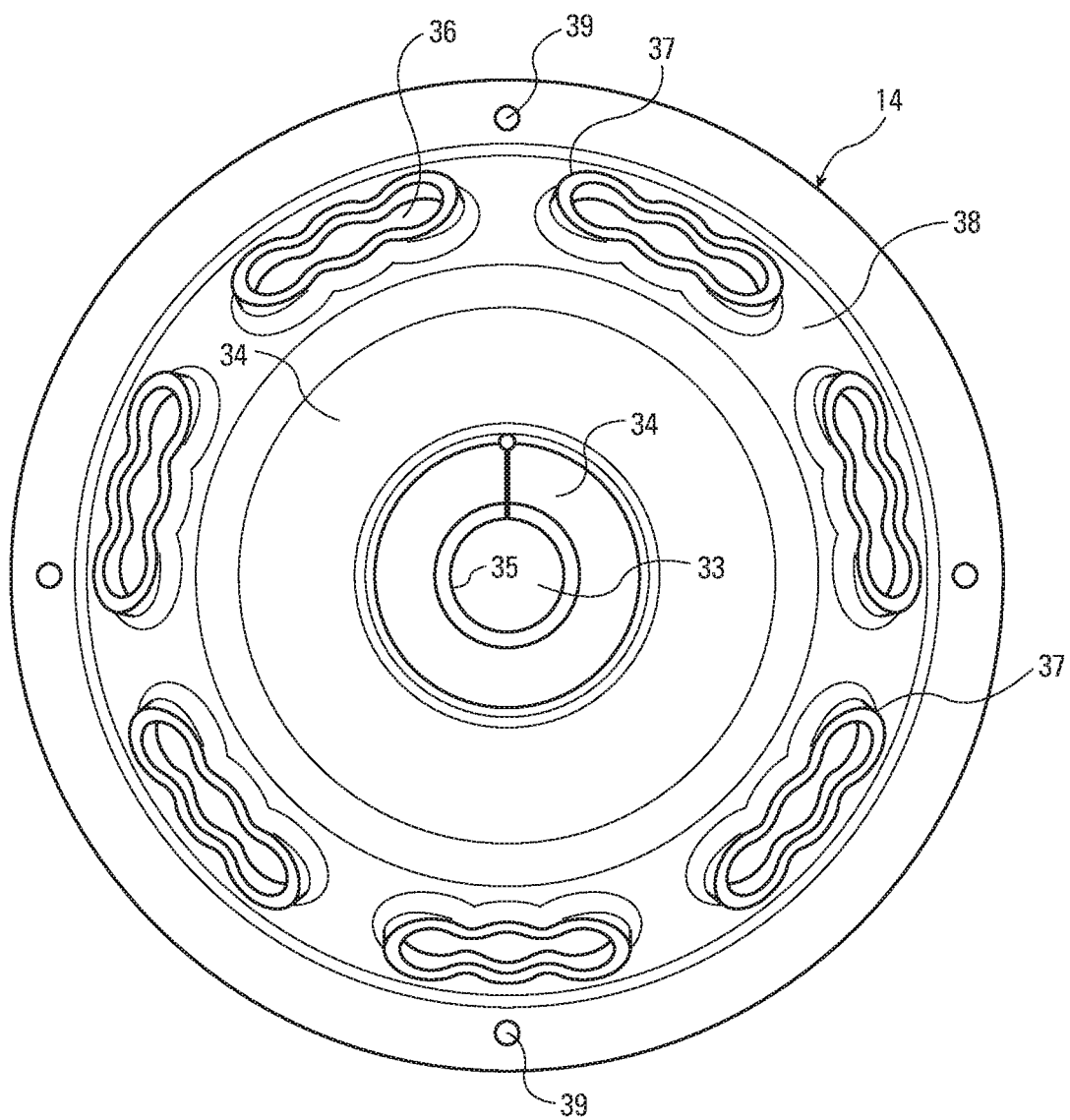
FIG. 24 is a front view of the connector plate of FIG. 23.
Figure 25:
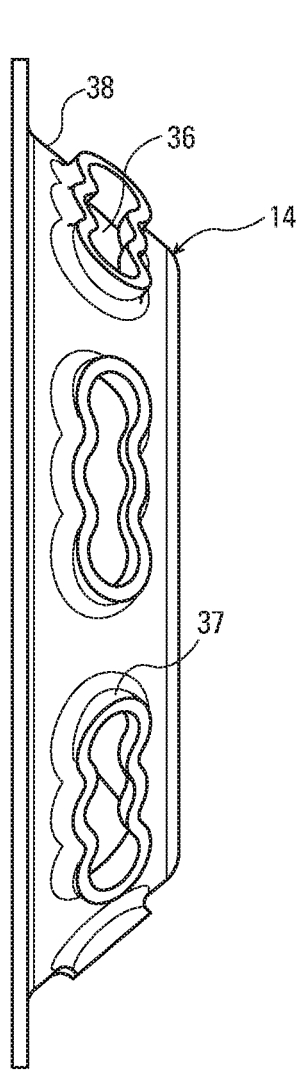
FIG. 25 is a left side view of the connector plate of FIG. 23.
Figure 26:
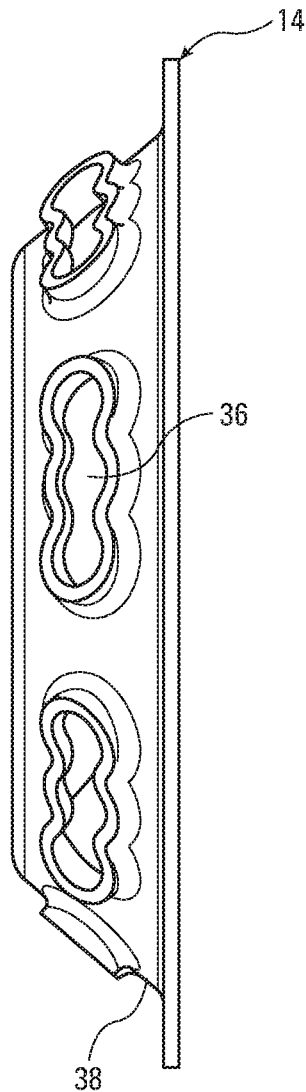
FIG. 26 is a right side view of the connector plate of FIG. 23.
Figure 27:
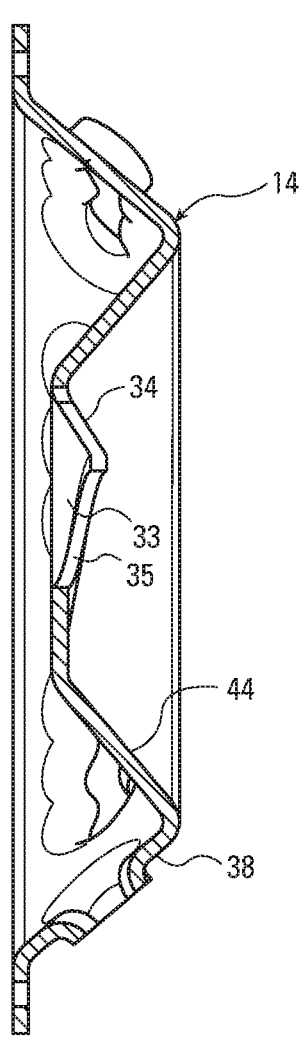
FIG. 27 is a cross-sectional, side view of the connector plate of FIG. 23.
Figure 28:
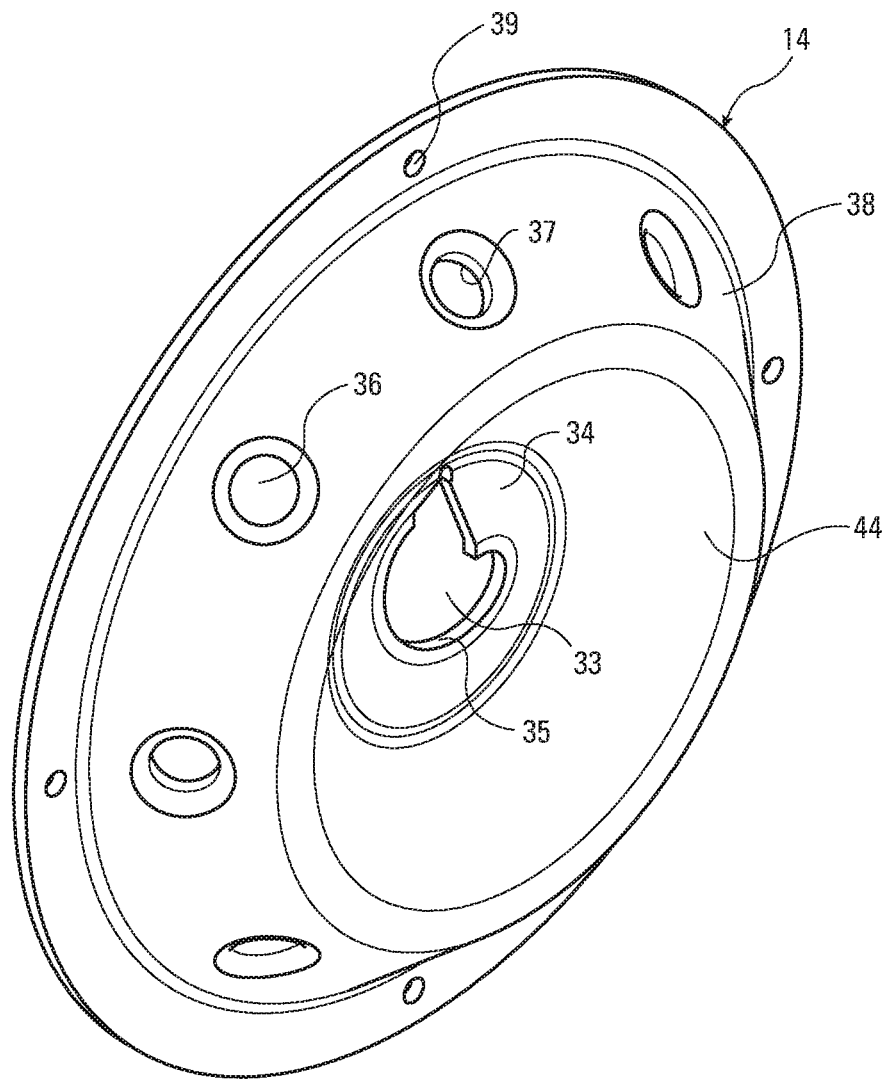
FIG. 28 is a perspective view of a fourth embodiment of the connector plate of the present invention.
Figure 29:
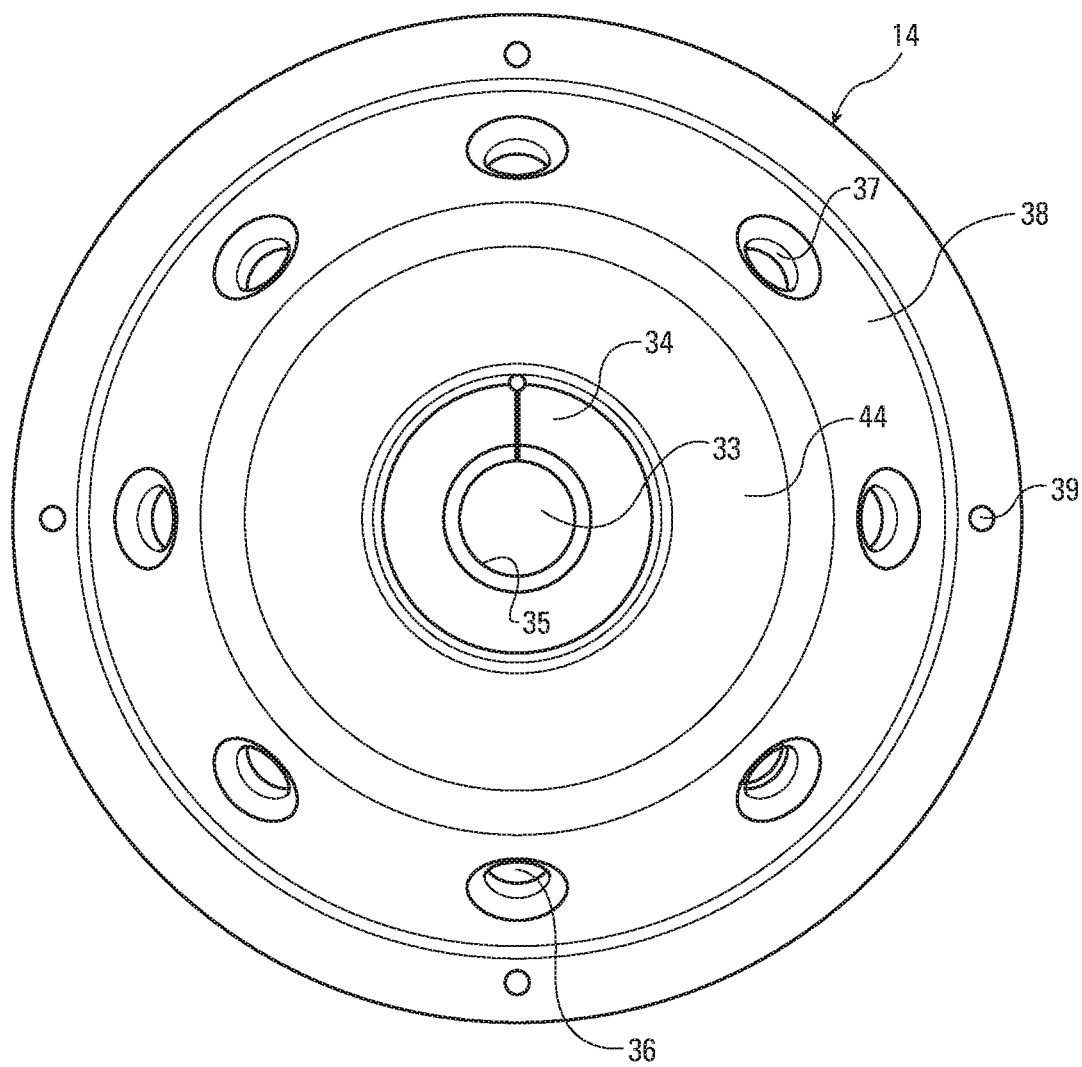
FIG. 29 is a front view of the connector plate of FIG. 28.
Figure 30:
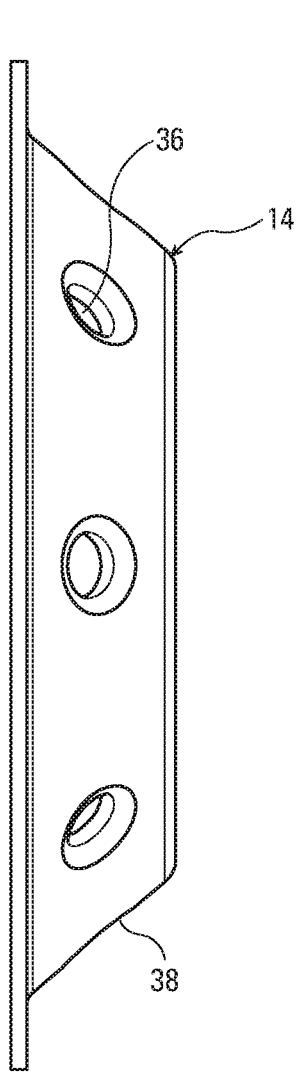
FIG. 30 is a left side view of the connector plate of FIG. 28.
Figure 31:
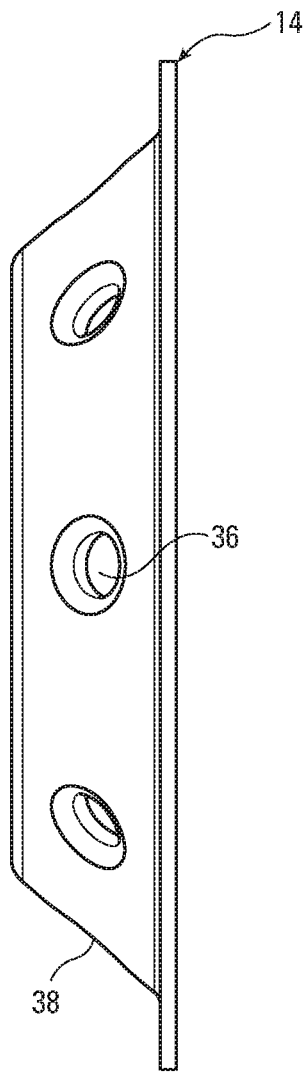
FIG. 31 is a right side view of the connector plate of FIG. 28.
Figure 32:
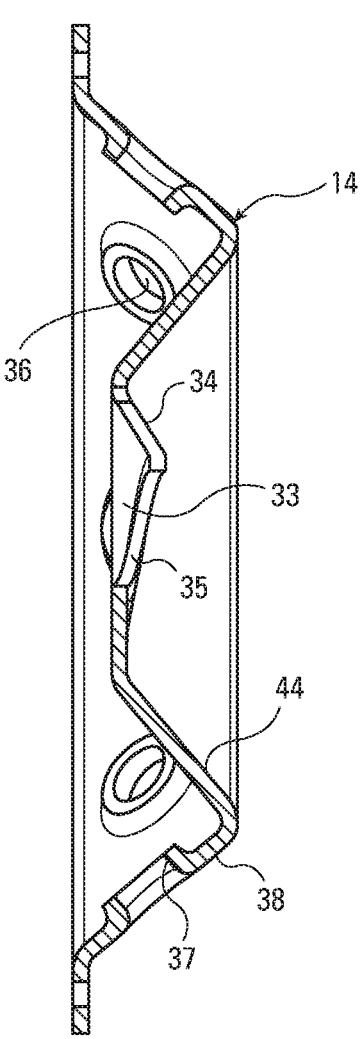
FIG. 32 is a cross-sectional side view of the connector plate of FIG. 28.
Figure 33:
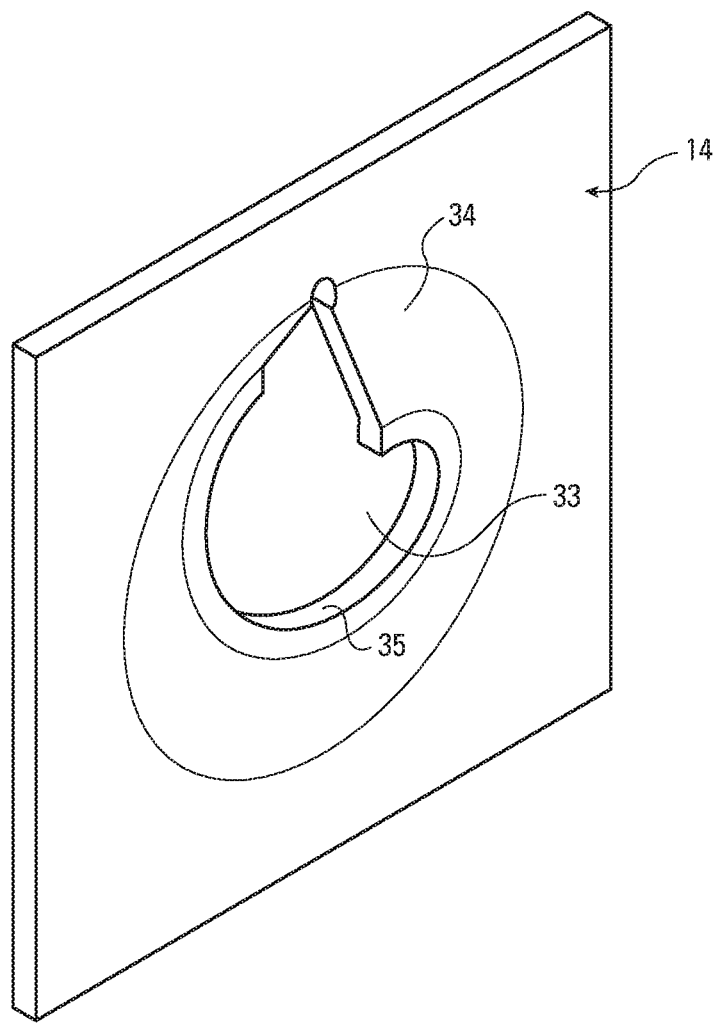
FIG. 33 is a perspective view of the compression strut opening in the connector plate of the present invention.
Figure 34:
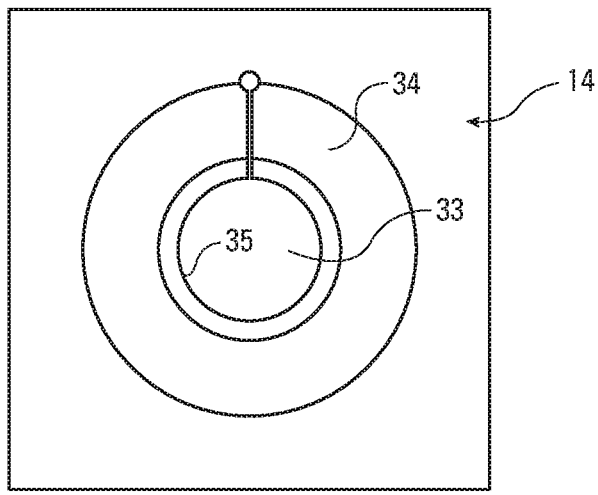
FIG. 34 is a front view of the compression strut opening shown in FIG. 33.
Figure 35:
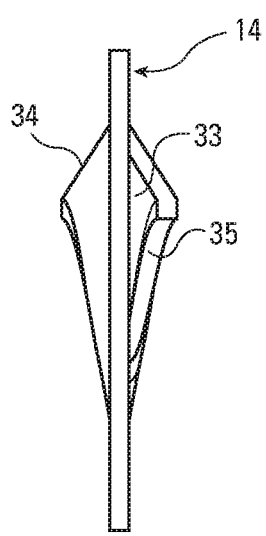
FIG. 35 is a right side view of the compression strut opening shown in FIG. 33.
Figure 36:
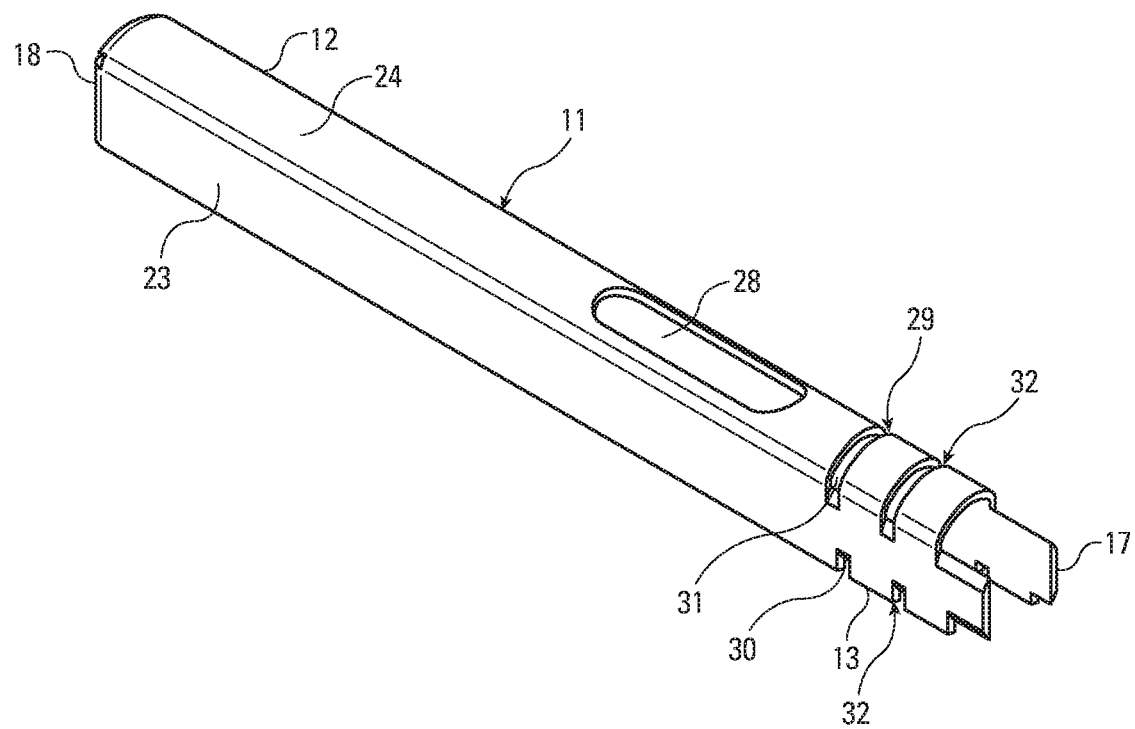
FIG. 36 is a perspective view of another embodiment of the compression strut of the present invention.

As shown in FIG. 1, the connector plate 14 if preferably formed with one or more tension fastener openings 36 to receive the one or more tension fasteners 15. The tension fastener openings 36 can be formed with drawn edges 37 to strengthen the openings and help orient the tension fasteners 15 received in the openings 36 in the proper angled direction toward the one or more inner structural members 2. As shown in FIG. 1, the connector plate is formed with an angled gusset 38 that orients the tension fastener openings 36 with respect to the outer member 1 to also help direct the tension fasteners 15 upwardly and at an angle to the horizontally disposed compression strut 11. As shown in FIGS. 6, 7 and 14 the connector plate 14 can be formed as a circular member, and the angled gusset 32 can be formed as circular member. In the embodiment where the connector plate 14 is formed as a circular member, a plurality of tension fastener openings 36 can be provided around the connector plate 14. As shown in FIGS. 16 and 17, the connector plate 14 and compression strut 11 are arranged such that the connection plate 14 engages a side face of the outer member 1 with one of the tension fastener opening 36 aligned with the compression strut 11 and a tension fastener is run through the tension fastener opening 36, the outer member 1, the longitudinal opening in the compression strut 11, through the veneer 4 and into the one or more inner structural members 2.

Figure 41:
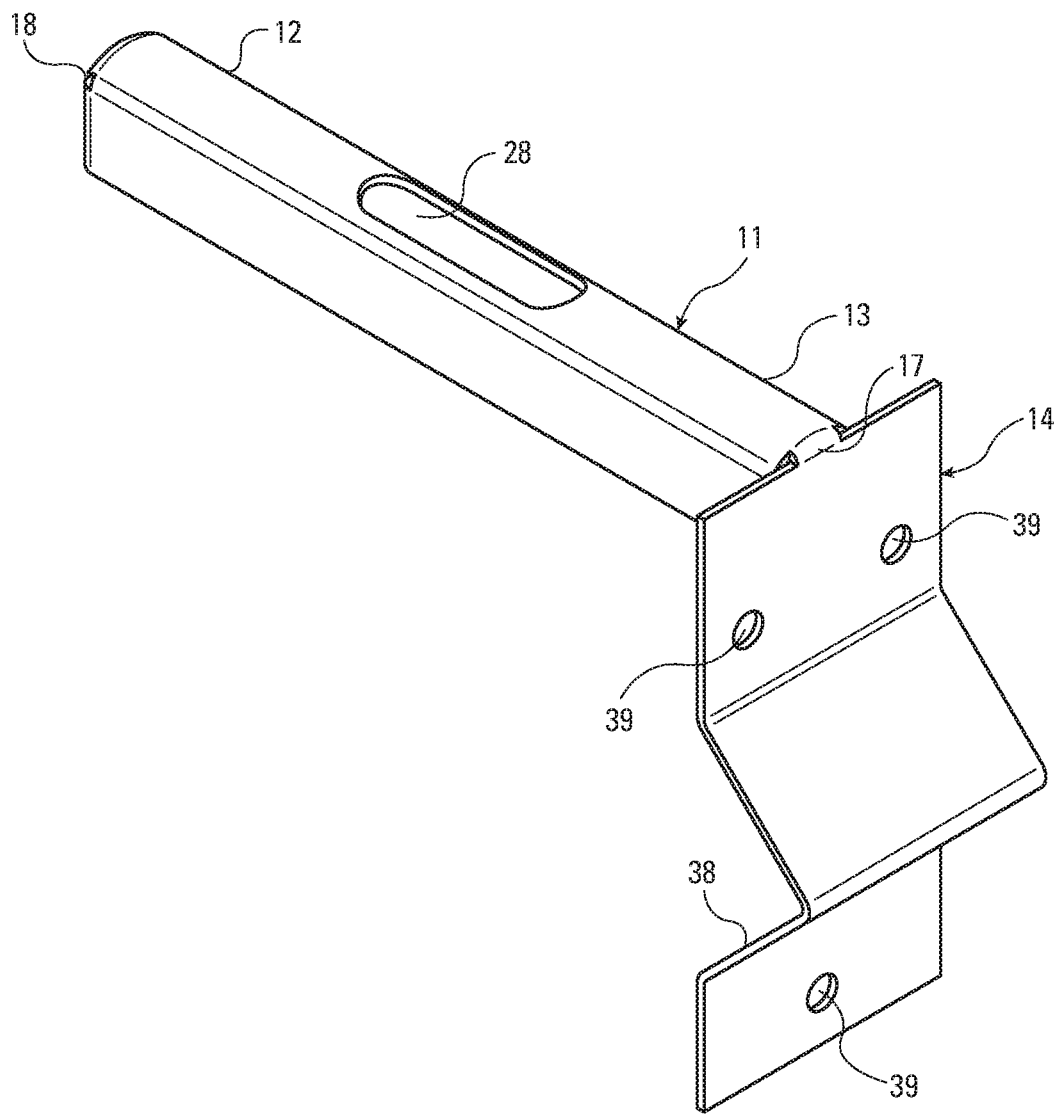
FIG. 41 is a perspective view of an alternate embodiment of the present invention where the connector plate is fixed to the compression strut.
Figure 42:
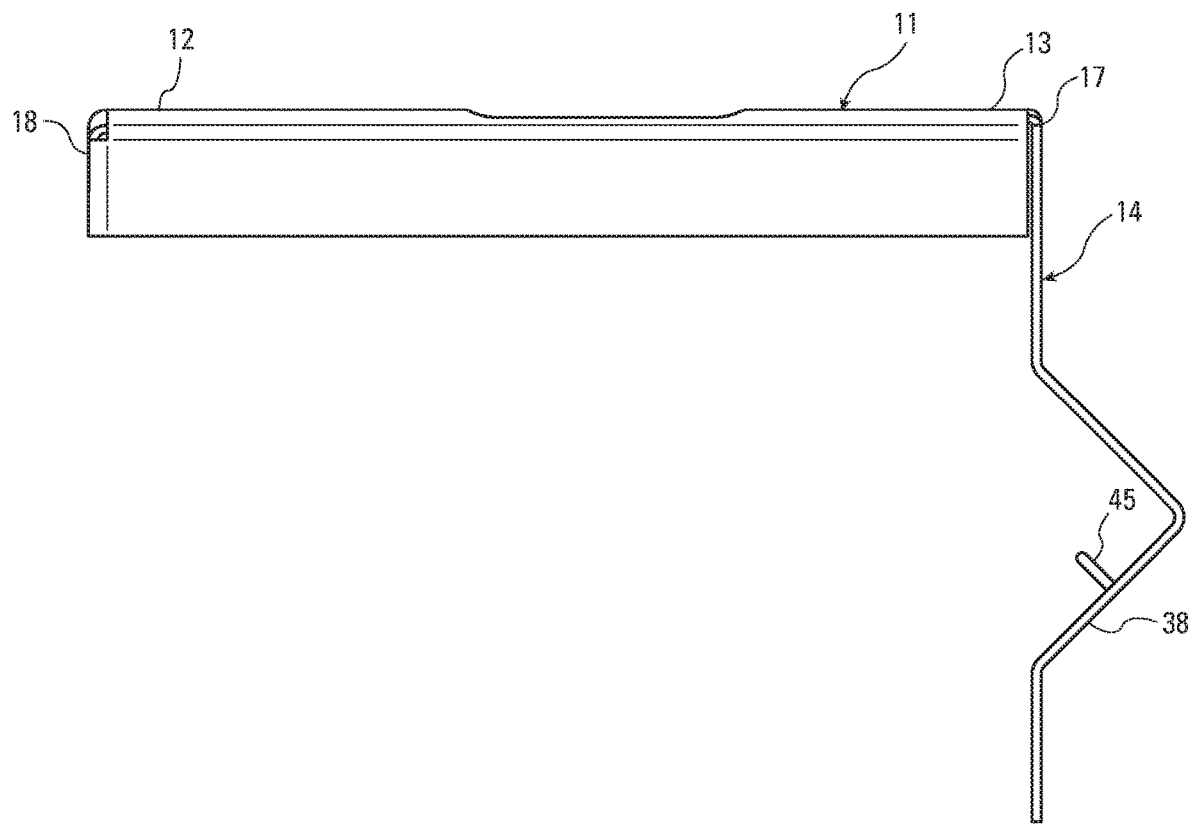
FIG. 42 is a left side view of the one-piece embodiment shown in FIG. 41.
Figure 43:
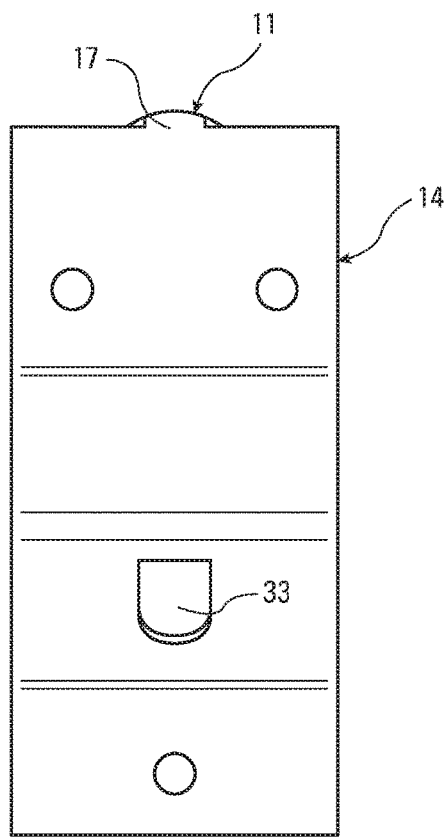
FIG. 43 is a front view of the one-piece embodiment shown in FIG. 41.
Figure 44:
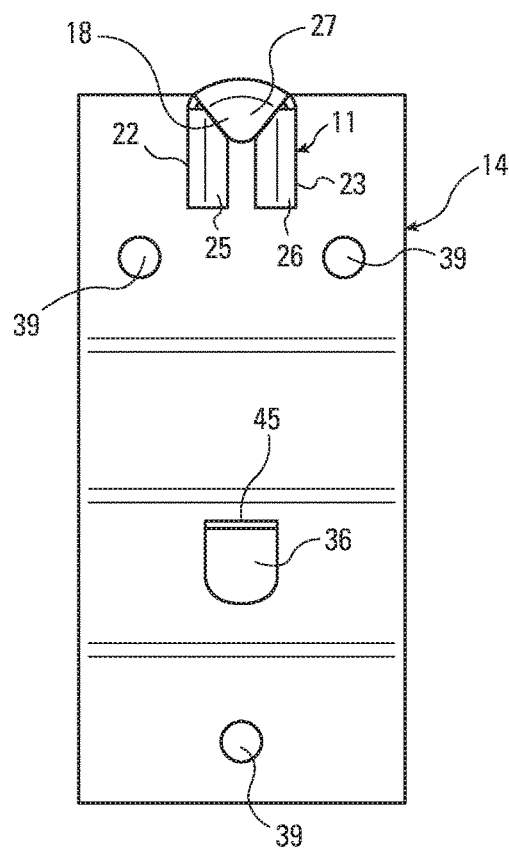
FIG. 44 is a back end view of the one-piece embodiment shown in FIG. 41.
Figure 45:
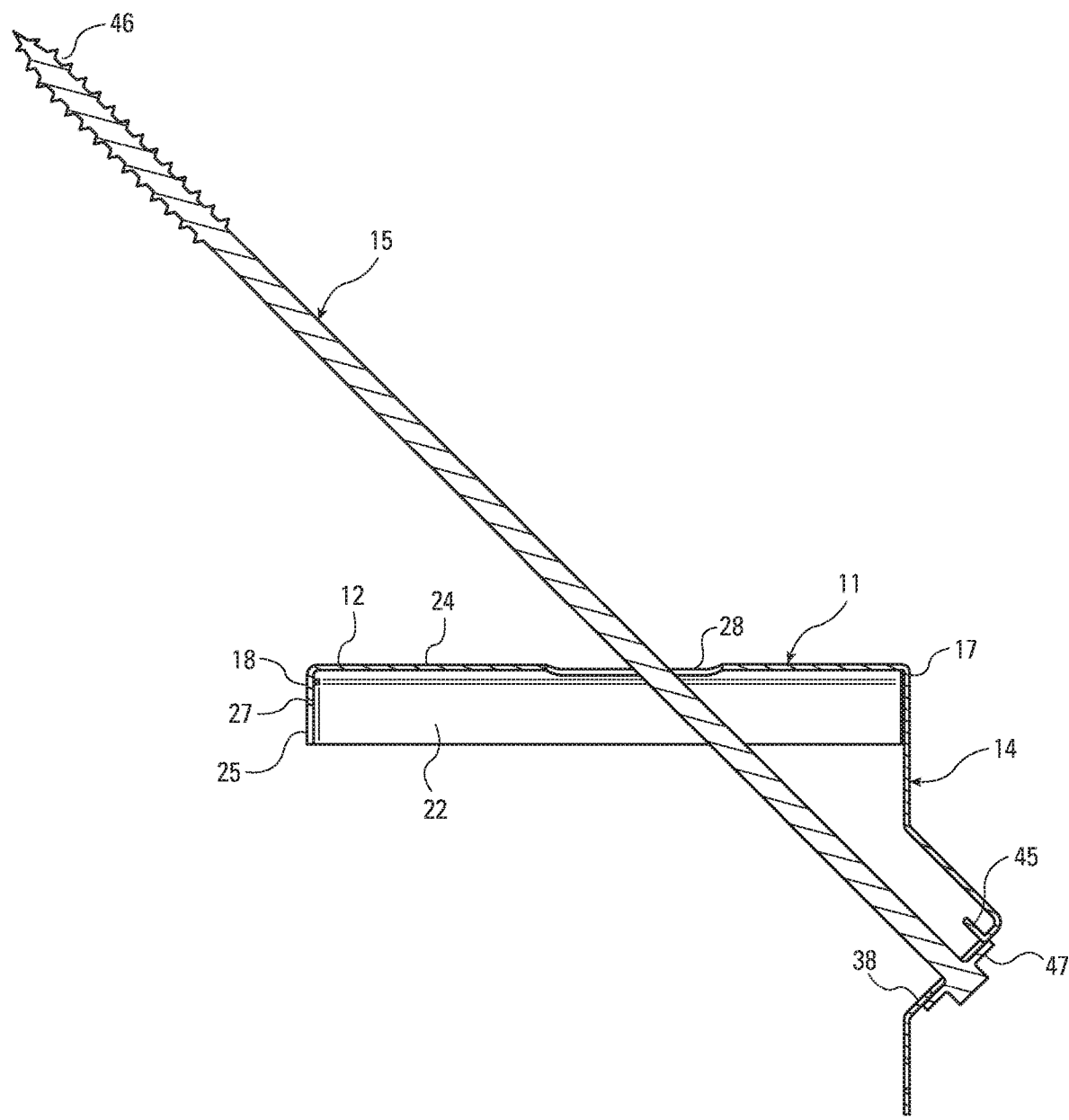
FIG. 45 is a cross-sectional side view of the one-piece embodiment shown in FIG. 41 with an elongated fastener shown attached to the connector plate and inserted through the elongated opening in the compression strut.
Figure 46:
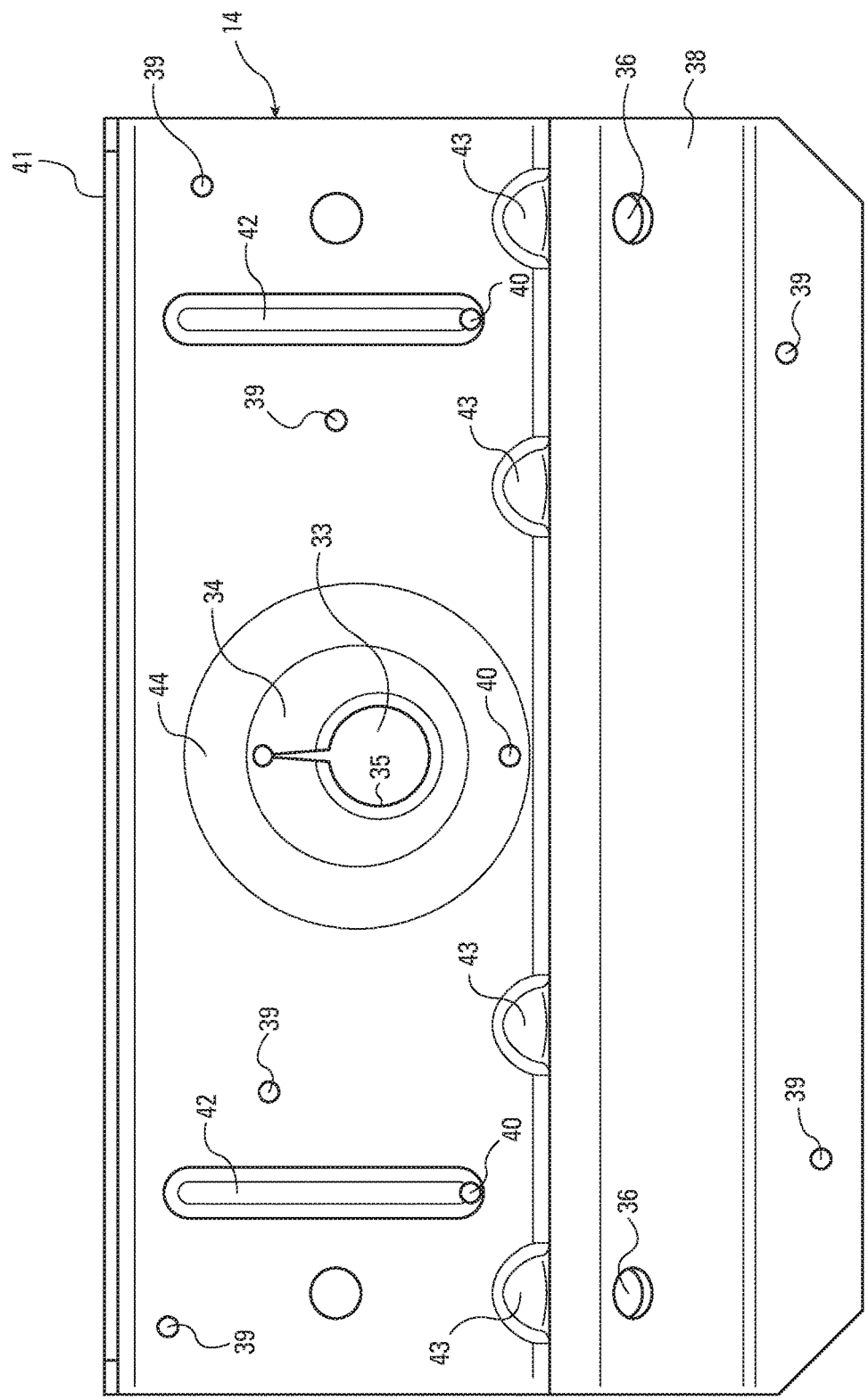
FIG. 46 is front view of another embodiment of the connector plate of the present invention.
Figure 47:
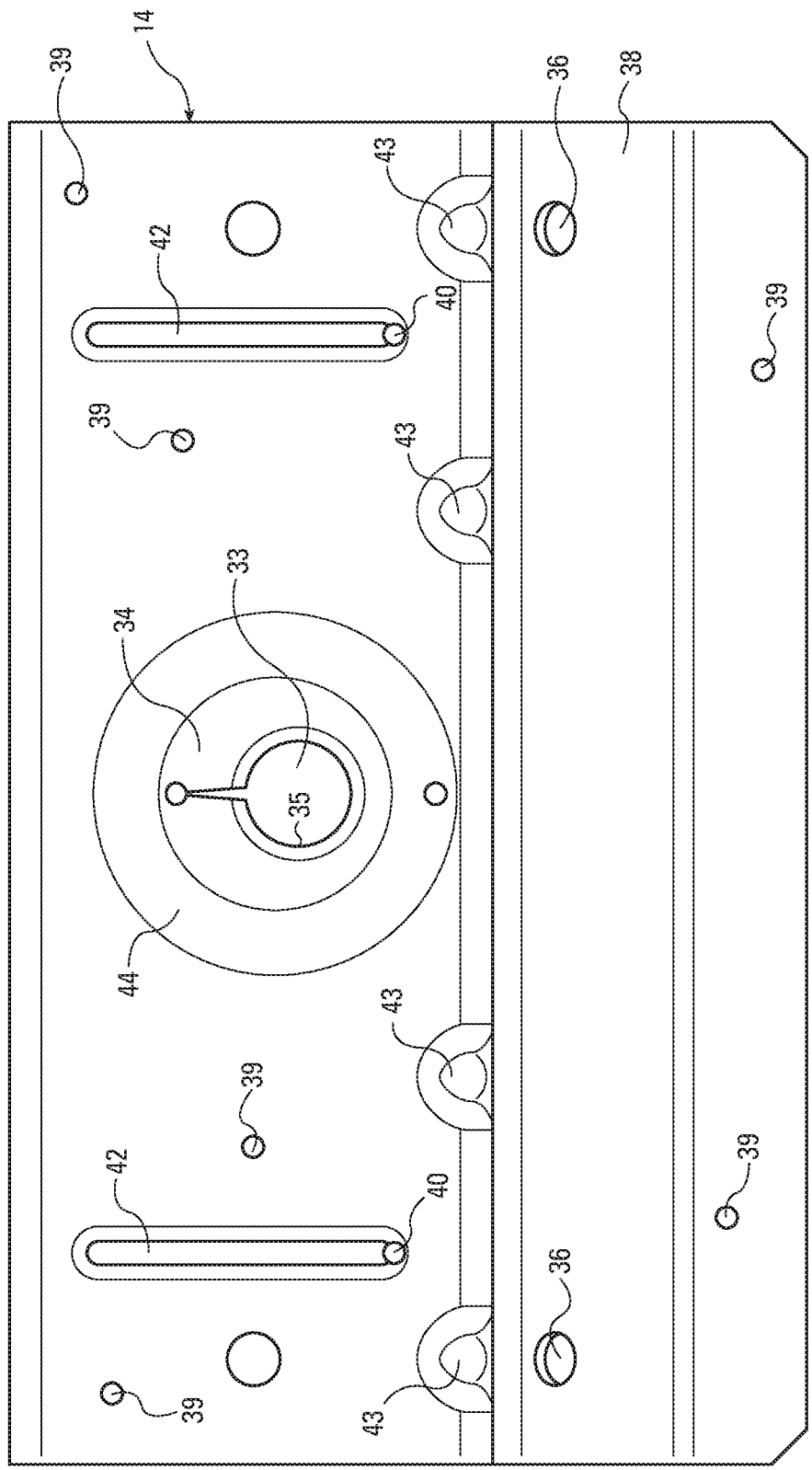
FIG. 47 is a back view of the connector plate of FIG. 46.
Figure 48:
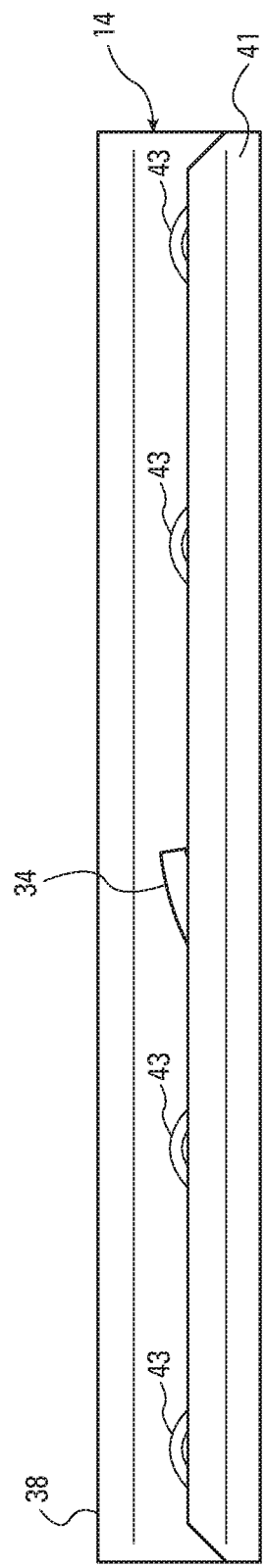
FIG. 48 is a top view of the connector plate of FIG. 46.
Figure 49:
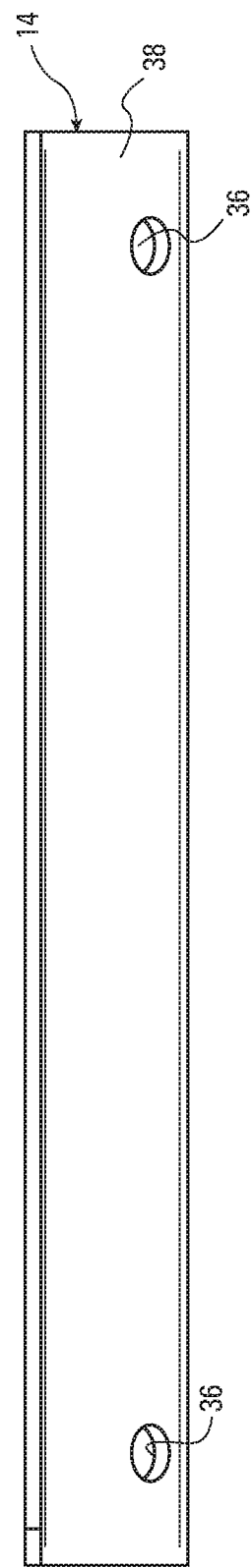
FIG. 49 is a bottom view of the connector plate of FIG. 46.
Figure 50:
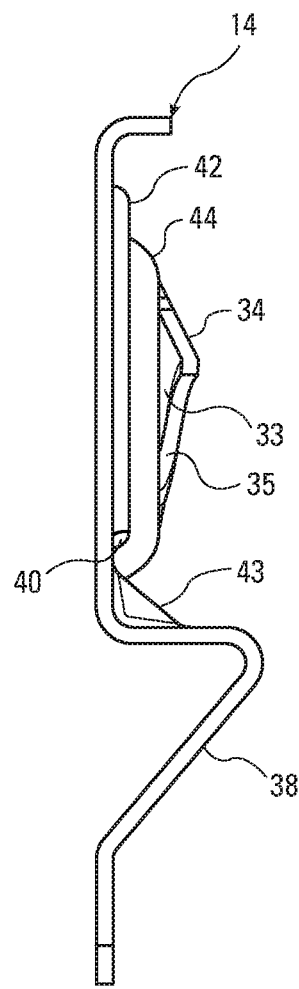
FIG. 50 is a left side view of the connector plate of FIG. 46.
Figure 51:
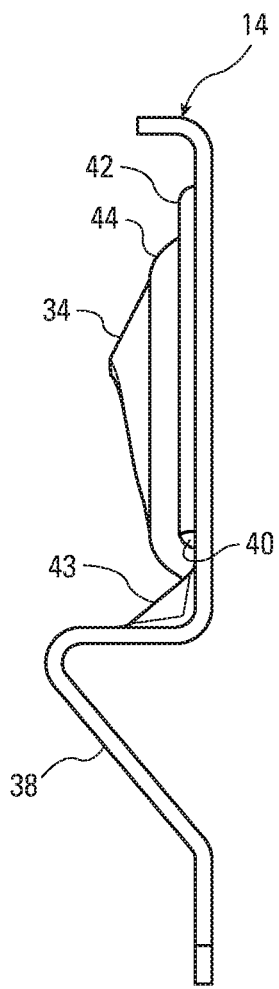
FIG. 51 is a right side view of the connector plate of FIG. 46.
Figure 52:
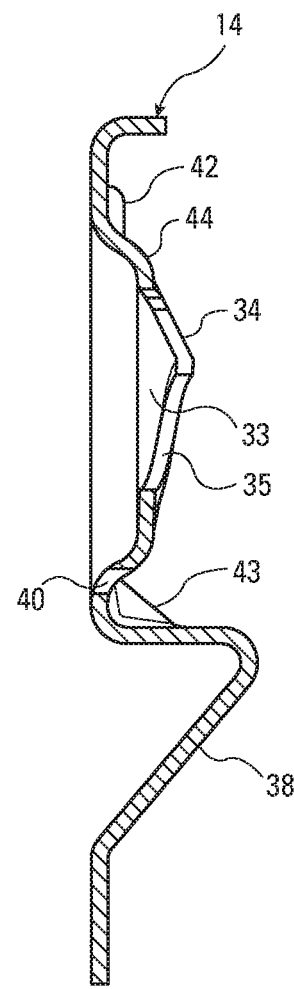
FIG. 52 is a cross-sectional side view of the connector plate of FIG. 46.
Figure 60:
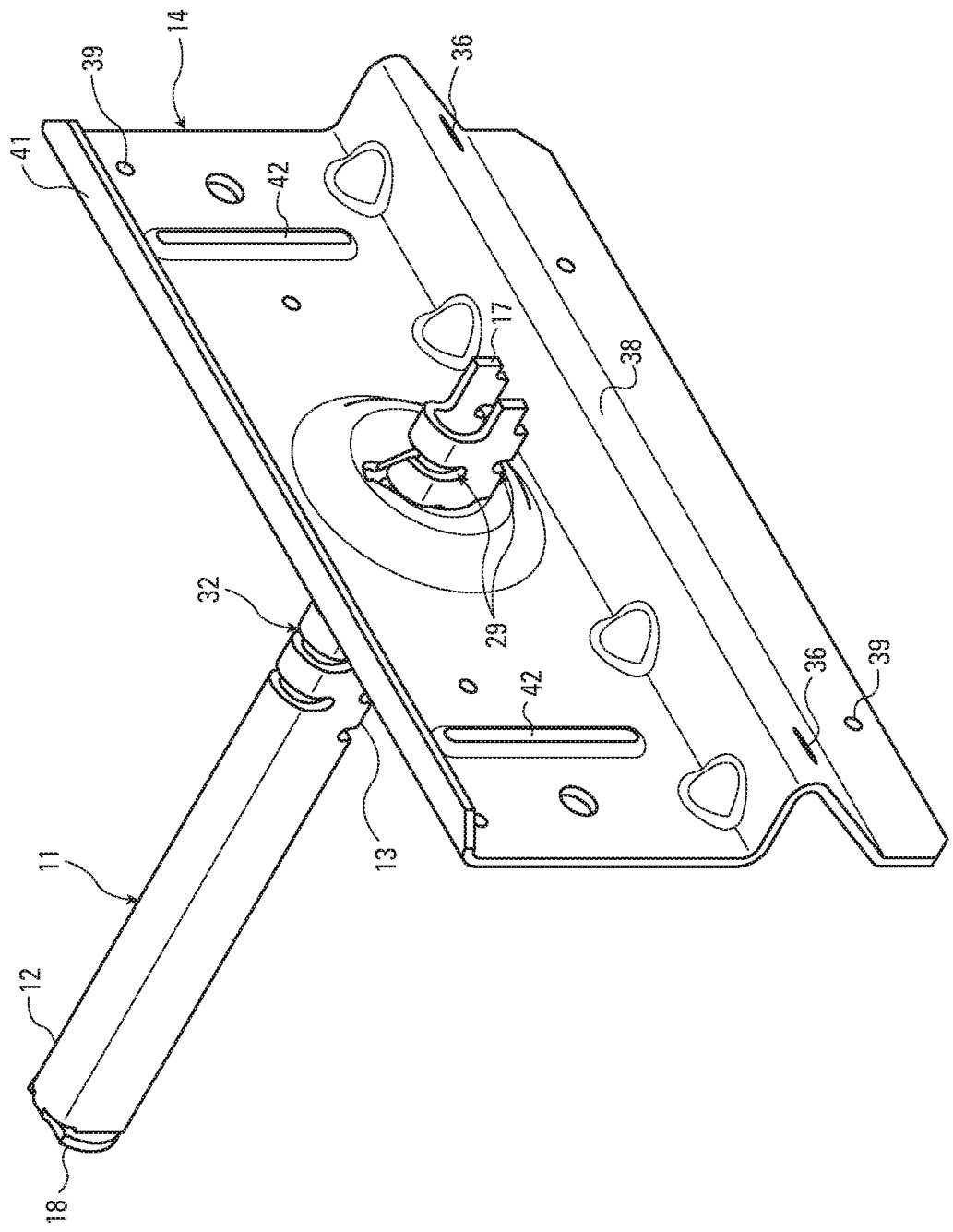
FIG. 60 is a perspective view of the connection plate and compression strut of FIG. 59 with the connection plate joined to the compression strut.

As shown in FIGS. 46 and 60, the connector plate 14 is preferably formed with a plurality of connection fastener openings 39 to assist the installer with driving the connection fasteners 16 through the connection plate 14 and into outer member 1. The connection fastener openings 39 help the installer know how many connection fasteners 16 should be used. The connector plate 14 can be formed with weep holes 40 to shed water. The connection plate 14 can be formed with strengthening flanges 41, embossments 42 and darts 43 to strengthen the connector plate. The strengthen flange 41 can be disposed at the top of the connection plate 14. As shown in FIG. 41, elongated embossments 42 can bracket the compression strut opening 33 and be disposed vertically. The darts 43 can strength the connection attachment portion of the angled gusset 38 to the main body of the connector plate 14. As shown in FIG. 60, a strengthening ring bend 44 can be formed around the compression strut opening 33.

In the embodiment of the invention shown in FIGS. 41-45, the compression strut 11 is formed as part of the connector plate 14. This one-piece embodiment is formed from sheet steel. The compression strut opening 33 in this embodiment is formed with a tab 45 to help direct the elongated tension fastener 15 received in the compression strut opening. 33.

Figure 59:
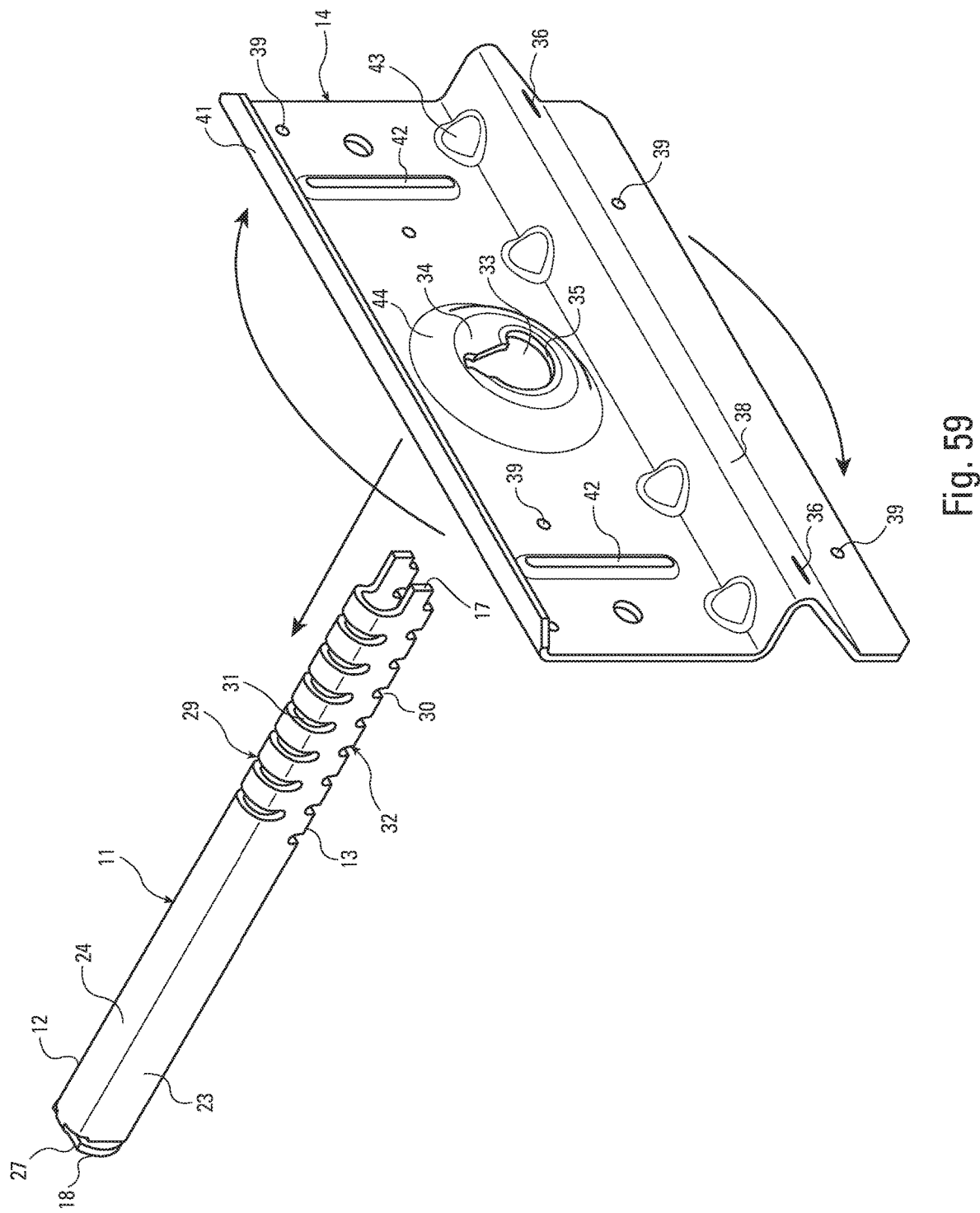
FIG. 59 is a perspective view of the compression strut of FIG. 53 and the connector plate of FIG. 46, showing the connector plate about to be connected to the compression strut. The curved arrows represent the relative rotation between the connection plate and the compression strut.

As shown in FIG. 59, the connection is preferably made with two 14" Strong-Drive SDWH Timber-Hex HDG tension screws, serving as the tension fasteners 15. The tension fasteners are formed with a self-drilling, threaded end portion 46 for engaging the inner structural members 2 and a head 47 for engaging the connection plate 14. The connection is preferably made with six Strong Drive SD Connector shear screws serving as the connection fasteners 16. The connection fasteners 16 are preferably self-drilling, threaded fasteners. The fasteners are preferably coated with zinc or some other protective layer to reduce corrosion. The preferred connector plate 14 is made from 12 gauge sheet steel. The compression strut 11 is also preferably formed from bent sheet steel.

The compression strut 11 can be installed through the veneer 4 at a mortar joint 6. The connection with a brick veneer or outer covering 4 placed between the one or more inner structural members 2 and the outer member 1 can be formed in the following manner. The locations for the connector plate 14 or additional connector plates 14 are marked on the veneer 4. The compression strut opening 33 on the connector plate 14 is aligned with the mortar joint 6 between bricks 5, if the veneer 4 is a brick wall. A bore 48 for the compression strut 11 is drilled where the compression strut opening 33 is located through the veneer 4 using a hammer drill and preferably a 1.125" masonry drill bit. One or more upwardly angled holes 49 are then drilled through the veneer for the one or more tension fasteners 15. Preferably the drill bit for these holes 49 are also 1.125" masonry drill bits. The holes 49 are preferably drilled at a 40 degree angle from the horizontally disposed compression strut member 11. Angled bores 50 for the tension fasteners 15 and a bore 51 for the compression strut 11 are then drilled in the outer member 1. The compression strut 11 is then engaged with the connector plate 14 and inserted into the bore 51 of the outer member or ledger board 1. Typically multiple compression struts 11 and connector plates 14 will be used to connect an outer member 1 to the building 3. When multiple connections are made for one outer member 1, the compression struts 11 and connector plates 14 to be installed at the ends of the ledger board 1 are joined to the outer member 1 first with the compression struts protruding 11 from the ledger board 1. The outer member 1 is then placed against the veneer 4 with the compression struts 11 inserted into the openings 48 in the veneer 1 and the tension fasteners 15 for the attached connector plates 14 are driven into the one or more inner framing members 2. Then the compression struts 11 are rotated inwardly with respect to the connector plates 14 so that the inner ends 18 of the compression struts 11 bear against the one or more inner structural members 2. The connection fasteners 16 are then driven through the connection plate 14 into the outer member 2. Any additional compression struts 11 and connector plates 14 can then be placed on the outer member 1 and connected as described.

Figure 62:
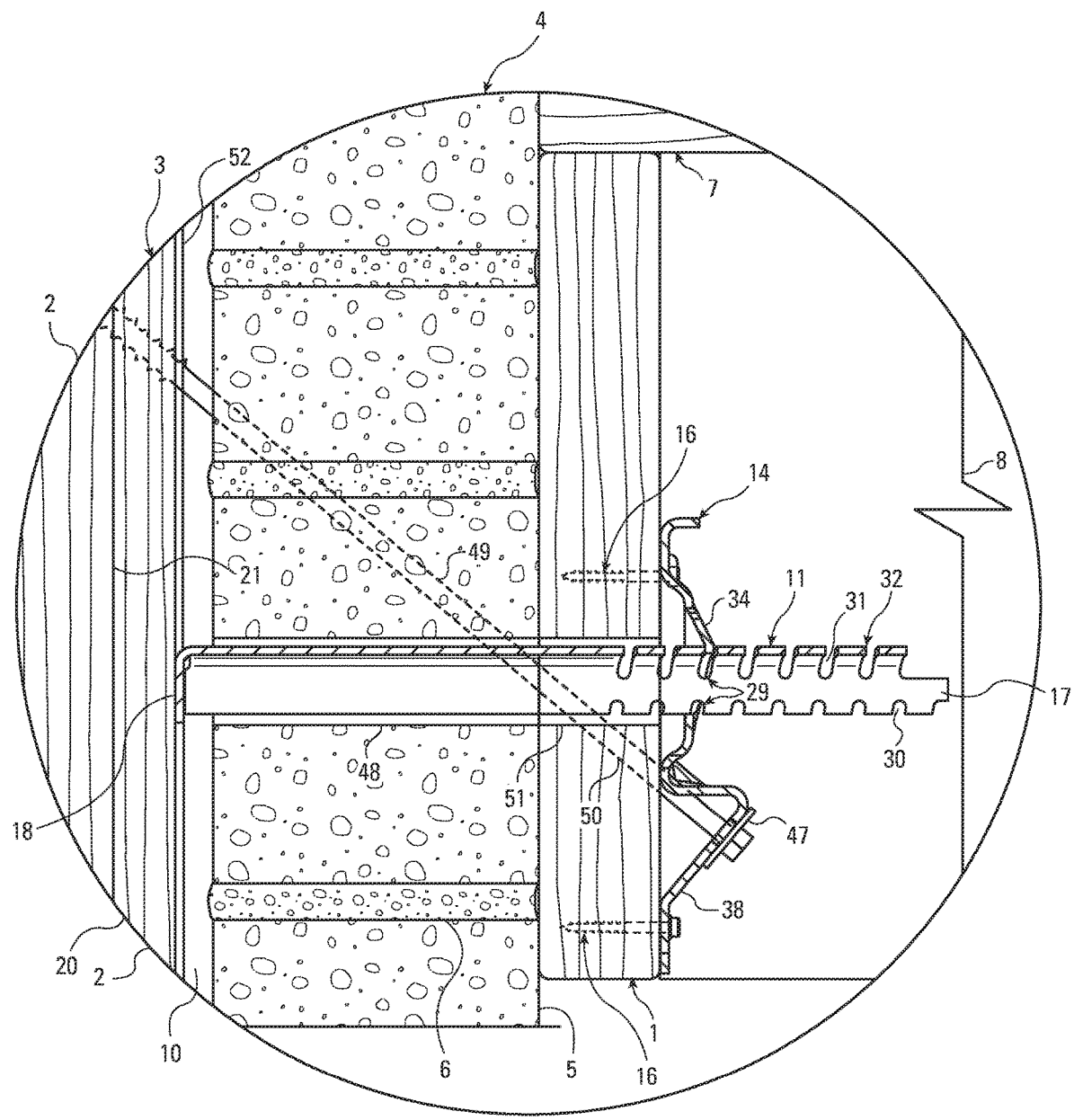
FIG. 62 is an enlarged view of the connection of FIG. 61.
Figure 63:
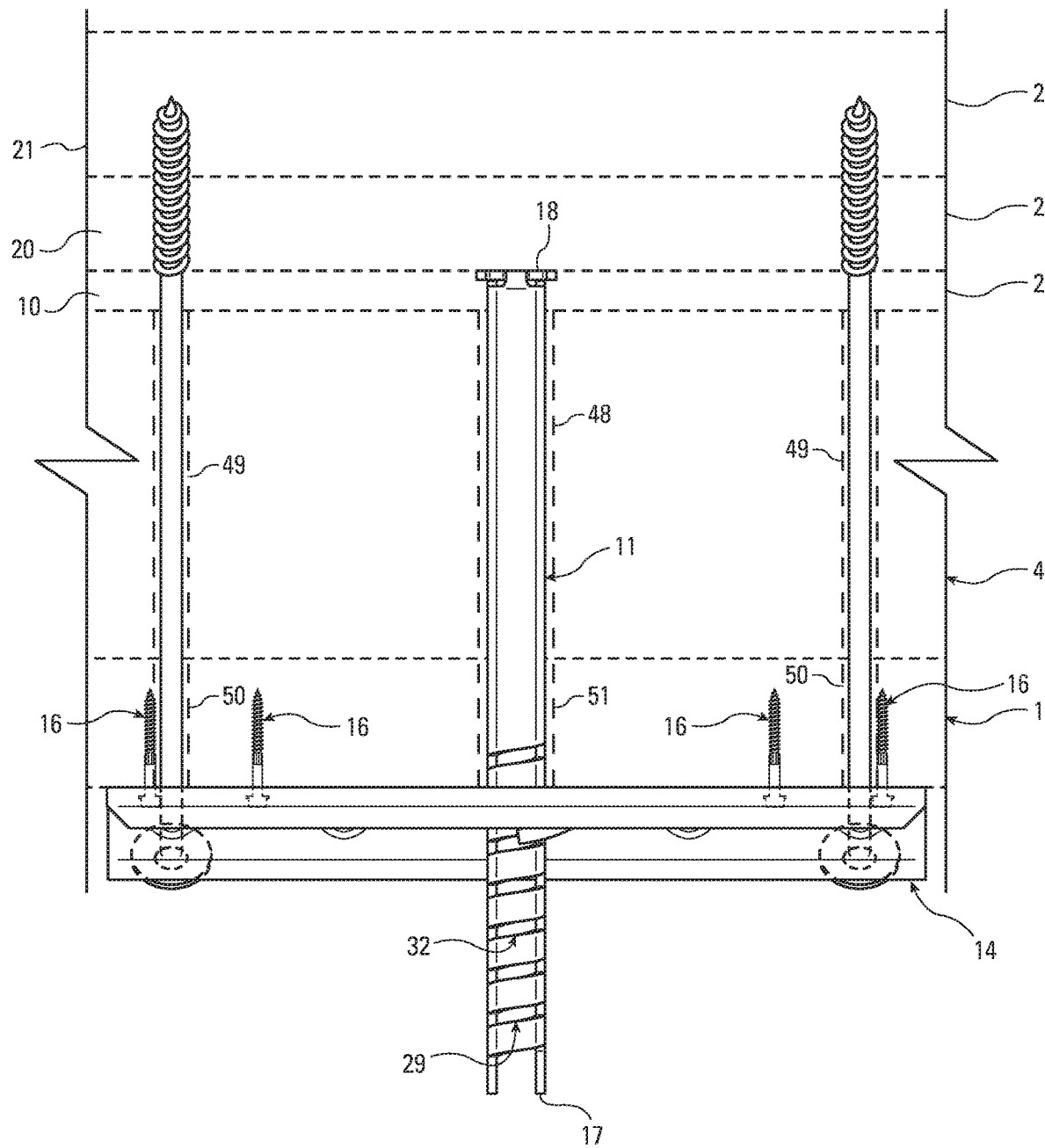
FIG. 63 is top view of the connection shown in FIG. 61 with the outer member, the facade and the inner structural members shown in dotted lines.

As shown in FIGS. 61 and 62, the inner structural members 2 of the exterior wall 9 can be covered by a layer 52 usually meant to help protect the exterior water from water. This layer 52 is applied to the outer surface 19. It is generally thin or compressible and provides no effective structural resistance, such that the inner end of the 18 of the compression strut 11 effectively bears against the inner structural members 2.

We claim:

1. A connection between an outer member and one or more inner structural members, the connection comprising:
   a. the outer member;
   b. the one or more inner structural members;
   c. a compression strut having an inner portion and an outer portion the inner portion having an inner end that abuts and bears against a side surface of one of the one or more inner structural members and does not enter the one or more inner structural members, and the outer portion being connected to the outer member;
   d. a connector plate engaging the compression strut and connecting the outer member to the compression strut;
   e. one or more separate tension fasteners attaching the connector plate to one or more of the one or more inner structural members; wherein
   f. the elongated compression strut extends horizontally from the one or more inner structural members and the one or more tension fasteners extend upwardly at an acute angle to the horizontally disposed elongated compression strut toward the one or more inner structural members.

2. The connection of claim 1, wherein:
the one or more tension fasteners are disposed non parallel with the elongated compression strut.

3. The connection of claim 1, wherein:
the compression strut has an inner end and an outer end and the outer portion of the elongated compression strut holds the connector plate at a selected location along the elongated compression strut between the inner end and the outer end of the compression strut.

4. The connection of claim 1, wherein:
the compression strut is formed with one or more catches that can hold the connector plate at various locations along the length of the compression strut.

5. The connection of claim 4, wherein:
the catches are formed in a helical arrangement along the compression member forming a track.

6. The connection of claim 5, wherein:
the compression strut is formed as a u-shaped channel with side walls and a web.

7. The connection of claim 6, wherein:
the catches are a series of notches in the side walls and elongated openings in the web of the compression member.

8. The connection of claim 4, wherein:
the connection plate is formed with a compression strut opening that receives the compression strut, and one or more edges of the compression strut opening in the connection plate engage with the catches on the compression strut.

9. The connection of claim 8, wherein:
the connection plate can be translated along the compression strut by rotating the compression strut with respect to the connection plate, or by rotating the connection plate with respect to the compression strut.

10. The connection of claim 8, wherein:
the compression strut opening is formed with one or more flanges to engage the track of the compression strut.

11. The connection of claim 10, wherein:
the one or more flanges of the compression strut opening are arranged to form a helical engagement portion.

12. The connection of claim 1, wherein:
a veneer is placed between the one or more inner structural members and the outer member, and the elongated compression strut and the one or more tension fasteners pass through the veneer.

13. The connection of claim 1, wherein:
the one or more inner structural members are part of the framing of a building and the outer member is a ledger board for a deck, and one or more connection fasteners attach the connector plate to the outer member.

14. The connection of claim 1, wherein:
the one or more inner structural members are part of the wall of a building.

15. The connection of claim 1, wherein:
the connection plate is formed with a compression strut opening that receives the compression strut.

16. The connection of claim 15, wherein:
a veneer is placed between the one or more inner structural members and the outer member, and the elongated compression strut and the one or more tension fasteners pass through the veneer.

17. The connection of claim 16, wherein:
the compression strut has an inner end and an outer end and the outer portion of the elongated compression strut holds the connector plate at a selected location along the elongated compression strut between the inner end and the outer end of the compression strut.

18. The connection of claim 17, wherein:
the one or more inner structural members are part of the framing of a building and the outer member is a ledger board for a deck, and the veneer is made up of bricks and mortar with an air gap between the veneer and the one or more inner structural members.

* * * * *